United States Patent [19]
Albright et al.

[11] Patent Number: 6,110,228
[45] Date of Patent: Aug. 29, 2000

[54] METHOD AND APPARATUS FOR SOFTWARE MAINTENANCE AT REMOTE NODES

[75] Inventors: David Hendrick Albright, Endicott; Steve Zevan, Owego, both of N.Y.

[73] Assignee: International Business Machines Corporation, Armonk, N.Y.

[21] Appl. No.: 08/365,269

[22] Filed: Dec. 28, 1994

[51] Int. Cl.[7] .................................. G06F 9/00; G06F 7/00
[52] U.S. Cl. ............................. 717/11; 713/100; 709/221; 709/217; 709/203; 707/200
[58] Field of Search ................... 395/700, 650, 395/200.09, 200.02, 200.05, 200.1; 717/11; 713/100; 709/221, 217, 203, 210; 707/200, 203, 10

[56] References Cited

U.S. PATENT DOCUMENTS

| | | | |
|---|---|---|---|
| 4,558,413 | 12/1985 | Schmidt et al. | 364/300 |
| 5,019,963 | 5/1991 | Alderson et al. | 364/200 |
| 5,113,519 | 5/1992 | Johnson et al. | 395/600 |
| 5,142,680 | 8/1992 | Ottman et al. | 395/700 |
| 5,155,847 | 10/1992 | Kirouac et al. | 395/600 |
| 5,247,683 | 9/1993 | Holmes et al. | 395/700 |
| 5,257,368 | 10/1993 | Benson et al. | 395/600 |
| 5,263,164 | 11/1993 | Kannady et al. | 395/700 |
| 5,269,014 | 12/1993 | Ogino | 395/500 |
| 5,303,145 | 4/1994 | Griffin et al. | 364/401 |

*Primary Examiner*—Tarig R. Hafiz
*Assistant Examiner*—Tuan Q. Dam
*Attorney, Agent, or Firm*—Arthur J. Samodovitz

[57] ABSTRACT

A computer network system includes a central software service site that operates with a customer interface through which a customer at a remote location can request service and receive updated executable code back from the service site. The customer interface provides a seamless front end across the different software platforms of the network. A customer initiates servicing of a program product by composing a service request through the front end, which provides a mechanism for the collection of information regarding the nature of the customer request. The front end permits the customer to specify a range of optional operations to be performed at the service site, including service research, requesting service, applying service, and installing fixes from the service site to the remote location. A service facility at the service site performs the requested service and provides the results back to the customer, or collects the service and returns the product and service to the remote location for application of service. The source code for the program product being updated resides only at the service site. All code is returned to the remote location over the network in a form that is ready to be executed. In a distributed implementation, the service site is provided as a central node and one or more slave nodes that also perform service.

73 Claims, 18 Drawing Sheets

```
CFG1      Configure Customer Product Image Profile

Press a PF key to indicate the intended action...

Product Information
    Image Name . . . . . . . . . . . : _____
    Product ID . . . . . . . . . . . : _____
    Feature. . . . . . . . . . . . . : _____
    Component. . . . . . . . . . . . : _____
    Level. . . . . . . . . . . . . . : Y R M
    Service Level. . . . . . . . . . : _____
    Target System / Nickname . . . . : _____
    Target System Level. . . . . . . : _____  (F2 - Edit F7/F8 - Scroll)
    Resident Products. . . . . . . . : _____

Customer
    Customer Name. . . . . . . . . . : _____ + Location . . :
    Customer Admin Node. . . . . . . : _____ + Location . . :

Modifications or User Exits
    Name of Mod/Exit . . . . . . . . : _____
    Name of Mod/Exit . . . . . . . . : _____

(C) IBM Corp. 1994.    All rights reserved.
Command ===>
F1=Help    F2=Add      F3=Exit      F4=List     F5=Update   F6=Delete
F7=Back    F8=Forward  F9=Retrieve                          F12=Previous
```

FIG. 7

```
CFG2    Configure Customer Product Image Profile

Press a PF key to indicate the intended action...

Product Information
    Image Name . . . . . . . . . . . :  _____
    Product ID . . . . . . . . . . . :  _____
    Feature. . . . . . . . . . . . . :  _____
    Component. . . . . . . . . . . . :  _____

Service Research
    Identify HIPERs. . . . . . . . . :  _ (Y/N)
    Identify PEs . . . . . . . . . . :  _ (Y/N)
    Identify PEFIXes . . . . . . . . :  _ (Y/N)
    Identify Pre-Requisites. . . . . :  _ (Y/N)
    Identify Co-Requisites . . . . . :  _ (Y/N)
    Identify Hard Reqs . . . . . . . :  _ (Y/N)

(C) IBM Corp. 1994.  All rights reserved.
Command ===>
F1=Help   F2=Add     F3=Exit    F4=List      F5=Update    F6=Delete
F7=Back   F8=Forward F9=Retrieve                          F12=Previous
```

```
CFG5     Configure Software Product

Type an action code.    Then press Enter.
    B=Browse  E=Edit  D=Delete

Product Id: _____       Product Image: _____

Action   FileName   FileType   Description

PROFILE    EXEC       Profile exec for service machine (C) IBM Corp. 1994.  All rights reserved.
Command ===>
F1=Help  F2=Add  F4=List  F7=Backward  F8=Forward  F9=Retrieve  F12=Cancel
```

FIG. 10

```
RESAPPLY    Research and Apply Product Service
Product ID/Description : _____

Product Image . . . . . : _____               Severity . . . . . . . : __ (1 is A)
Current Service Level : __ (C/P/H/A)    Apply with Open PEs: __ (Y/N)
Requisites            : __ (Y/N)         Get all HIPERS? . . : __ (Y/N)
Send Service Only     : __ (Y/N)

Customer   David Albright _____

APAR   PTF   APAR   PTF   APAR   PTF   APAR   PTF   APAR   PTF
____   ____  ____   ____  ____   ____  ____   ____  ____   ____
____   ____  ____   ____  ____   ____  ____   ____  ____   ____
____   ____  ____   ____  ____   ____  ____   ____  ____   ____
____   ____  ____   ____  ____   ____  ____   ____  ____   ____
____   ____  ____   ____  ____   ____  ____   ____  ____   ____
____   ____  ____   ____  ____   ____  ____   ____  ____   ____

(C) IBM Corp. 1994.  All rights reserved.
Command ===>
F1=Help  F2=Research  F3=Exit  F4=Prompt  F5=Apply  F6=History  F12=Cancel
```

```
INST          Install Serviced Software Product Files
                                                               ⎫
Press a PF key to indicate the intended action...              ⎬ 24a
                                                               ⎭

Action Code  . . . . . . . . . . . :  ____

Product Information
   Product ID . . . . . . . . . . :  _____        (F4 for List)
   Image Name . . . . . . . . . . :  _____
   Feature  . . . . . . . . . . . :  _____
   Component  . . . . . . . . . . :  _____
   Level  . . . . . . . . . . . . :  V   R   M
   Service Level  . . . . . . . . :  _____

Installation information
   Target System / Nickname  . . . :  _____
   Installation Date . . . . . . . :  _____     (12/25/94)
   Installation Time . . . . . . . :  _____     (13:24:08)

(C) IBM Corp. 1994.  All rights reserved.
Command ===>
F1=Help  F3=Exit  F4=List  F6=History  F7=Install  F9=?  F12=Cancel
```

*FIG. 14*

METHOD AND APPARATUS FOR SOFTWARE MAINTENANCE AT REMOTE NODES

BACKGROUND OF THE INVENTION

1. Field of the Invention

This invention relates generally to software support in distributed systems and, more particularly, to software maintenance at remote nodes using facilities of a central site.

2. Description of the Related Art

In a distributed data processing system comprising a network of remote locations connected to a central mainframe computer processor, each remote location can include a computer processor to which many customers are connected. A customer can comprise, for example, a workstation user, a microcomputer terminal, or an information system support facility. Certain overhead and management functions might be performed by the mainframe computer at the central site, but much of the network data processing is performed at the remote locations by the remote location processors, particularly data processing tasks requested by the customers.

Each remote location is commonly referred to as a node of the network. Each remote location processor communicates with its connected customers through a remote location operating system and may include a variety of application programs that are invoked, or run, by the customers at the remote location. Typically, the operating systems and application programs comprise widely available, industry-standard software program products produced by a variety of vendors. A customer can generally tailor a program product for execution at a particular remote location to obtain proper interfacing with the network and with the remote location system and to invoke specially desired features of the product.

The computer programs comprising the remote location operating system and application programs will be changed from time to time as improvements are added to the programs and as programming errors, typically referred to as "bugs", are found and fixed. There generally are two different methods of propagating program changes throughout the distributed system. One method is to completely substitute an older program with a new version of the same program. In that case, the older program that is installed at a remote location is deleted from the remote program storage and is substituted with the completely new version of the program. The other method is to replace only the lines of programming code that have actually changed between the old version and the new version. Often, the program being changed will include a relatively extensive amount of code intended as update tools to help the customer incorporate the replacement changes and thereafter run the new, updated version. Whether the substitution method or replacement method is used, the updating of the program is referred to as the software "service" and is a very important aspect of software maintenance.

In distributed systems, the generally preferred method of program updating is the replacement method, because typically the programs being serviced comprise many lines of code and the changes between consecutive versions are modest in comparison. The update changes to a program are commonly referred to as a "fix". Performing the service involves obtaining the fix and incorporating or installing the changes into the program storage at the remote location. A program can be in use for many years and therefore its software maintenance history from the original program version through fixes can comprise a long sequence of service.

It is important for a system programmer charged with software maintenance to know that, after the update, the new version software product is a good product. That is, the installed fix should be free from error, should permit the changed program to operate without problems, and should not create new operating problems. On occasion, however, an error in a fix can be discovered. The error therefore requires a subsequent fix to the original fix. As noted above, a product in service for many years can accumulate a relatively large number of installed fixes. To ensure that the latest fix is valid, it is necessary to perform service research, which is the process of determining all of the changes necessary from the original program version to result in the fully updated program. For example, one fix might require other, preceding fixes to the original program version for proper operation. These preceding fixes are typically referred to as requisite fixes. Such information might be manually obtained in an individual effort by the system programmer, which requires cooperation between the programmer and the software vendor. The process of obtaining the sequence of fixes that have been created for a software product is known as service research.

After a particular set of fixes have been identified, the fixes must be gathered together for installation. Different program products might have different methodologies for obtaining program fixes. The fixes might be obtained, for example, as copies of code changes recorded onto magnetic tape or disk. Alternatively, the changes might be obtained over telecommunication lines such as through modem connections. Changes might also be received directly over the network to which the remote site is connected. Different program products also might have different ways of applying the fixes at the remote location, testing the changed program, and installing the changed program onto the system at the remote location.

Thus, each program in an operating system can have a different methodology for applying updates and updating a program product across different operating systems can be different. There presently is no common method of updating for all products on a given operating system or across all operating systems. From the discussion above, it should be apparent that there is a need for commonality in applying fixes to remote locations across operating systems and program products. The present invention satisfies this need.

SUMMARY OF THE INVENTION

In accordance with the invention, a computer network system includes a software maintenance facility at a central site that operates with a customer interface through which a customer at a remote location can request service and receive updated executable code back from the software maintenance facility. The customer interface provides a seamless front end across the different software platforms of the network. A customer initiates servicing of a program product by composing a service request through the front end, which provides a mechanism for the collection of information regarding the nature of the customer request. More particularly, the front end permits the customer to specify a range of operations, including service research, requesting service, applying service, providing fixes, and installing serviced product or fixes at the remote location. A service machine at the central site performs the requested service, and the results are provided back to the customer. Because the service research and application of service is done at the central site, it is not necessary for the customer to have a complete source code copy of programs at the remote location. Therefore, in accordance with the present invention, the source code for the program product being updated resides only at the central site. All program product code, either with the service already applied or ready for application by the customer, is returned to the remote location over the network in a form that is ready to be executed. In this way, the present invention provides a common method of updating for all products on a given operating system and across all operating systems while minimizing the duplication of program code and improving the efficiency of the service process.

In one aspect of the invention, the customer can specify that any unincorporated fixes are to be applied to the system of the customer, or optionally that only service that is free from error or has an error with an already completed fix is to be incorporated, or that no service is to be completed and that only the service research report is desired. If the fix is desired, then the service is applied at the central site and returned to the customer, or the fix and accompanying program are returned for application of service at the customer's location, depending on the implementation of the invention. In either case, executable code is provided back to the customer over the network. The executable code returned to the customer can be much smaller than what is normally provided with a service. This is especially true in the case of operating system changes, which can be relatively complex and lengthy program products. It eliminates the necessity of including within the program product many lines of code that are dedicated only to permitting the customer to add service updates.

In a distributed architecture implementation of the present invention, the central site comprises not a single processor but rather a collection of interconnected processors. More particularly, a central node receives all requests for service and parcels them out to a collection of slave nodes whose workload is managed by the central node. Each one of the slave nodes includes a service machine with multiple service processors. The central node determines which one of the slave nodes is ready for processing a service request and sends the next service request to that node. The central node preferably includes such service processing ability as well. In accordance with the distributed architecture, each node has access to the collection of customer information, remote location information, and source code and fixes necessary to perform any service that might be requested by a customer.

Other features and advantages of the present invention should be apparent from the following description of the preferred embodiment, which illustrates, by way of example, the principles of the invention.

BRIEF DESCRIPTION OF THE DRAWINGS

FIG. 7 and FIG. 8 are representations of a Configure Customer Product Image Profile display screen viewed by a remote location customer of the system illustrated in FIG. 1.

FIG. 10 is a representation of a Configure Software Product display screen viewed by a remote location customer of the system illustrated in FIG. 1.

FIG. 12 is a representation of a Research and Apply Product Service display screen viewed by a remote location customer of the system illustrated in FIG. 1.

FIG. 14 is a representation of an Install Serviced Software Product Files display screen viewed by a remote location customer of the system illustrated in FIG. 1.

DESCRIPTION OF THE PREFERRED EMBODIMENTS

Figure 1:
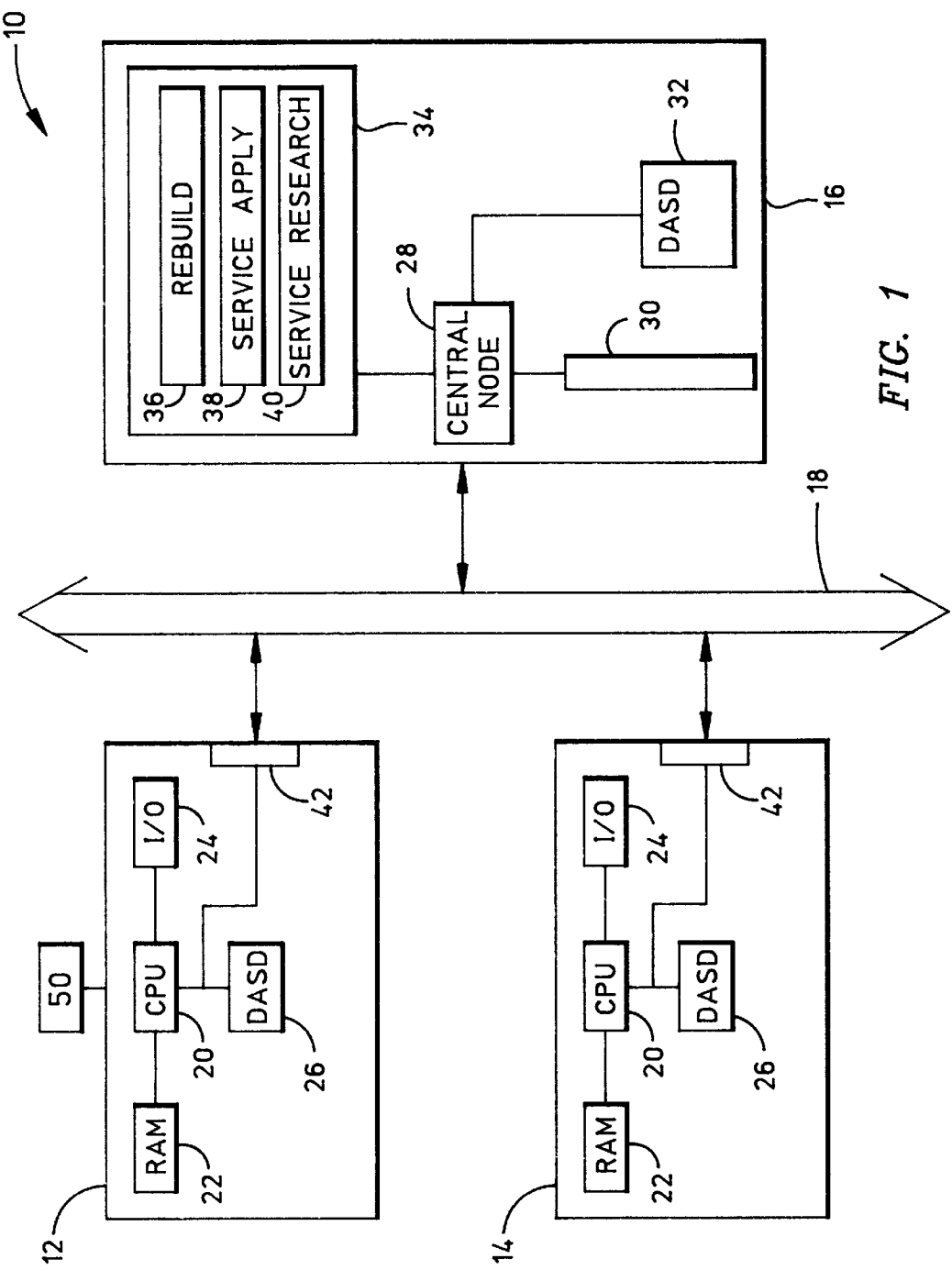
FIG. 1 is a block diagram of a computer network system constructed in accordance with the present invention.

FIG. 1 shows a computer network system 10 constructed in accordance with the present invention in which customers at remote locations, two of which 12, 14 are shown, communicate with a central site 16 over a network 18. Each remote location includes a central processor unit (CPU) 20, an associated operating random access memory (RAM) 22, one or more input/output (I/O) devices 24 such as keyboards, video monitors, printers, and the like, and one or more direct access data storage devices (DASD) 26. The central site 16 includes a central node control processor and network interface unit 28, a memory 30, one or more DASD units 32, and a service facility 34. The service facility includes a rebuild processor 36, a service application processor 38, and a service research processor 40. Requests for service are transmitted via a common service interface 42 at each remote location over the network to the service facility 34, where the central node control unit 28 schedules the requests with the appropriate service facility processor 36, 38, 40 and returns service reports, which can include executable code having the requested service applied, back to the requesting remote location over the network 18. In this way, all customers at remote locations 12, 14 communicate with the service facility through a commonly supported interface and receive service in executable code format. This permits a common interface for updating all programs over all operating systems and reduces the amount of program code necessary at each remote location.

The CPU 20 of each remote location can comprise, for example, a mainframe processor such as produced by International Business Machines Corporation ("IBM") and referred to as the "System/370" or "System/390" to which multiple customers can be connected. Alternatively, the CPU 20 can comprise a smaller machine such as a workstation or IBM "Personal Computer" ("PC") or similar machine. The service facility central node control unit 28 can comprise a mainframe CPU, workstation, or file server. Each of the service facility processors 36, 38, 40 can comprise a mainframe CPU, workstation, file server, or IBM PC-compatible machine, or alternatively can comprise a program resident in the memory 30 of the central site 16.

The service research processor 40 of the service facility 34 examines a set of data repository files in the data storage 32 to determine what level of service has already been applied to the computer program at the remote location. That is, the configuration of the computer programs of each remote location, as well as the computer configuration of each remote location itself, is maintained in data storage at the central site 16. Such data storage is updated as service is applied by the service facility 34. The service research processor also examines the configuration data storage to determine the highest current level of service that can be applied to the computer program. That is, it determines the latest fix to any program, including whether any errors have been discovered in the fix and whether there has been a subsequent fix. Finally, the research processor also examines the configuration data storage and identifies any service not yet applied to the computer program.

The service application processor 38 of the service facility 34 applies the requested service to the computer program. The service application processor can either retrieve source code or executable code and apply service. In the first case, the service application processor retrieves source code corresponding to the program to be serviced from the DASD storage 32, applies the service (which it also retrieves from storage) by making the appropriate programming code substitutions, updates software inventory and service history tables, and creates files that facilitate rebuilding executable code. If desired, the service application processor can retrieve executable code, to which service in the form of executable code changes will be applied.

The rebuild processor 36 of the service facility 34 rebuilds the computer program after the service has been applied. That is, the rebuild processor obtains and then processes the changed source code to provide executable code, such as by compilation or assembly the source code to which service has been applied and adds in the necessary data structures and protocols needed to install and execute the serviced program back at the remote location 12 and customer 50. Such data structures and protocols are implementation dependent according to the network system and processors in use, and therefore details of the rebuild processor operation will be known to those skilled in the art.

Figure 2:
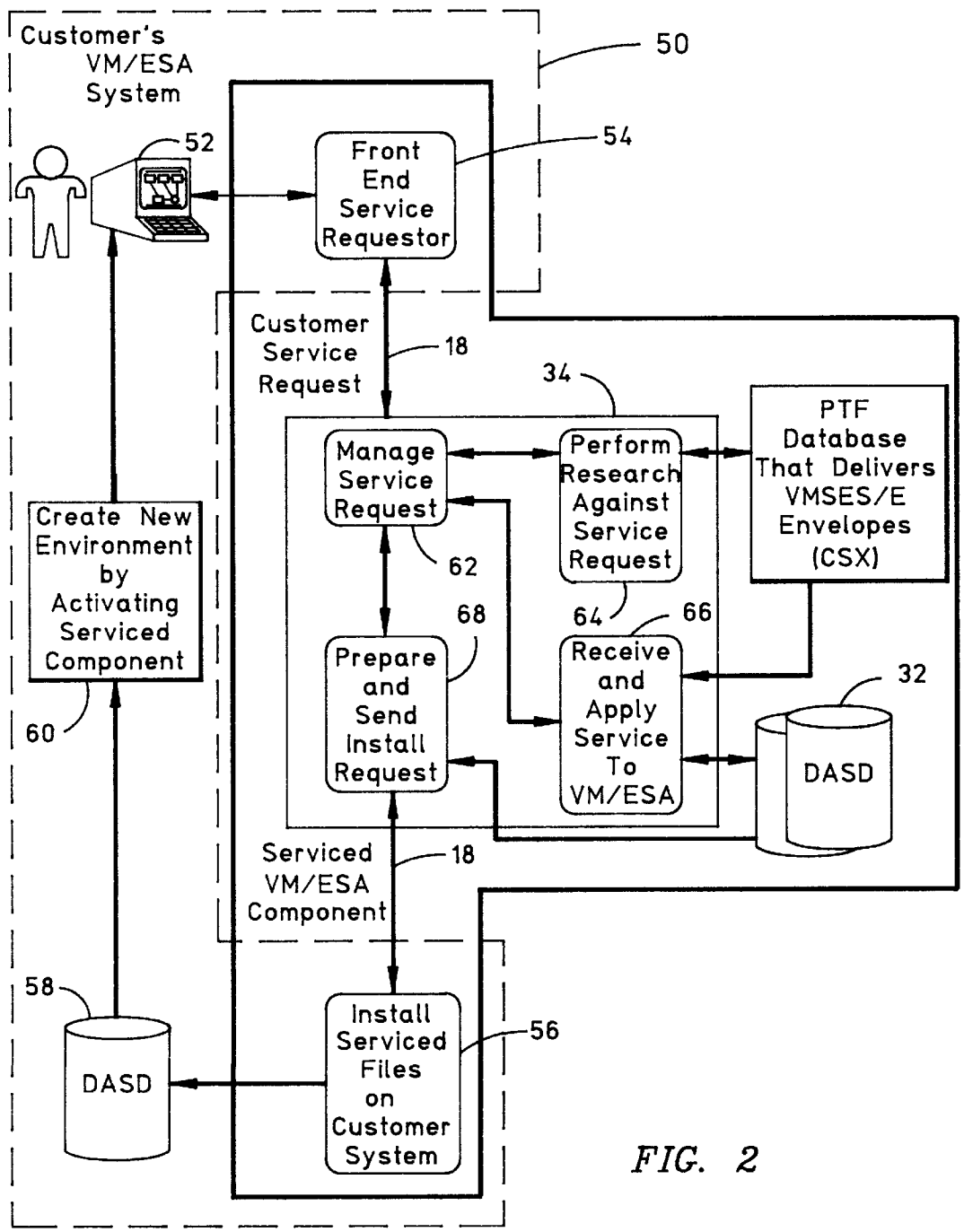
FIG. 2 is a representation of the processing flow and functional structure of the system illustrated in FIG. 1.

FIG. 2 is a functional block diagram that illustrates the data communication and processing that occurs in the network 10 and shows a single customer 50 connected to one of the remote locations 12 illustrated in FIG. 1. It is to be understood that the customer includes processing units like those illustrated in FIG. 1 for the remote location. That is, the customer 50 also includes a CPU with memory, I/O, and one or more DASD storage devices and communicates with the CPU 20 of its associated remote location. An operating interface 52 is represented as corresponding to the product referred to as "VM/ESA" provided by IBM, which is well-known to those skilled in the art and requires no further explanation. Operating interfaces other than the VM/ESA system of the preferred embodiment will occur to those skilled in the art, who also will appreciate that the operating system itself resides in the program memory of the remote location CPU 20 (FIG. 1), but is the means through which the customer 50 can communicate over the network 18 with the central site 16.

FIG. 2 shows that the customer includes a front end 54 interface through which communication with the service facility 34 at the central site 16 takes place. As described more fully below, the front end provides a customer-friendly interface that is common across all operating systems and remote location programs supported by the service facility and comprises the means by which the user specifies desired service research, service application, and installation as well as report formats. FIG. 2 also shows that serviced files 56, comprising executable programs with service applied, are returned from the service facility over the network 18 and are directed to a DASD 58 of the remote location customer 50. Such files constitute activated serviced components 60 that are incorporated into the customer operations by the operating system 52. It should be clear that, if the serviced files comprise the operating system of the remote location itself, then the serviced files are returned to a combination of the DASD 26 in the remote location and the DASD 58 of each remote location customer. Those skilled in the art will appreciate the nature of the serviced files and their respective destinations among the remote locations and customers of the network without further explanation.

FIG. 2 shows that the operation of the service facility 34 may be viewed as four major functional blocks, or operating steps. The first function performed by the service facility is to manage each service request 62 as it is received. In managing the service requests, the service facility schedules the requests among the processors 36, 38, 40 illustrated in FIG. 1 to accomplish the steps illustrated in FIG. 2 comprising performing service research 64, receiving and applying service 66, and preparing and installing the service in accordance with the installation request 68 received over the network. The operating steps performed by the service facility and front end will be better understood with reference to the data flow diagrams and pseudo code described below.

Figure 3:
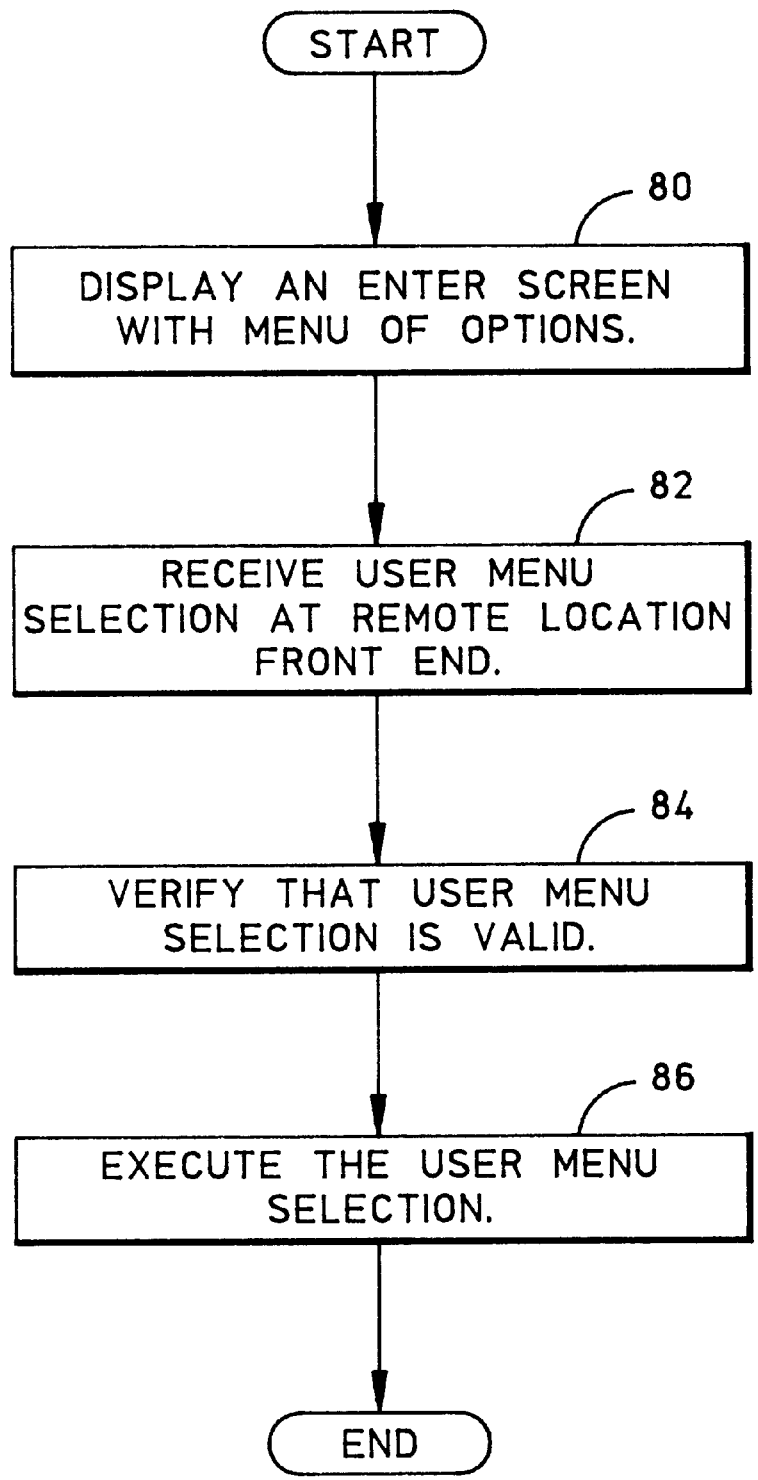
FIG. 3 is a flow diagram that illustrates the high-level processing of the system illustrated in FIG. 1.
Figure 4:
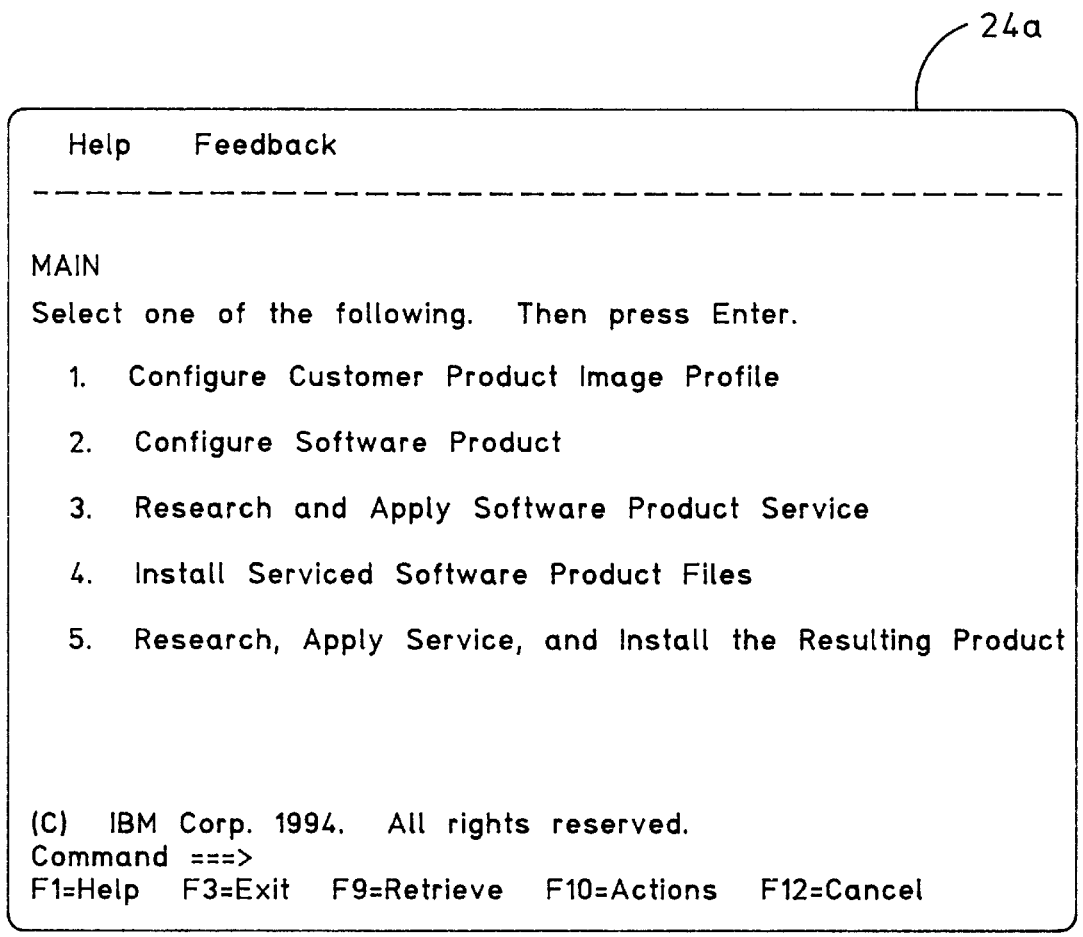
FIG. 4 is a representation of a display screen viewed by a remote location customer of the system illustrated in FIG. 1.

FIG. 3 illustrates the processing steps followed by the front end section 54 of the customer interface that is resident at the remote location 12. In the first processing step, represented by the flow diagram box numbered 80, an "Enter" screen is displayed to the customer 50. A sample Enter screen is illustrated in FIG. 4, which shows a screen entitled "Main" displayed on a video monitor screen 24a of the remote location customer 50. The screen shows that the customer can select from options including (1) configuration of a customer product image profile, (2) configuration of a software product, (3) research and application of a software product service, (4) installation of a serviced software product file, or (5) research, application of service, and installation of the resulting product.

Returning to FIG. 3, the next processing step comprises receiving a customer menu selection at the remote location front end. The customer menu selection comprises one of the options described above in connection with FIG. 4. This processing step is represented by the flow diagram box numbered 82. The next step, represented by the flow diagram box numbered 84, is for the system to verify that the customer menu selection is valid. This step comprises, for example, insuring that the customer has entered one of the numbers 1–5 designating a menu selection choice. If the menu selection is not valid, then an appropriate error message is displayed on the video monitor screen. The next processing step, assuming that the customer menu selection is valid, is to execute the customer menu selection, as represented by the flow diagram box numbered 86. The customer menu selection is executed by providing the menu selection to the service facility at the central site over the network.

The overall system processing steps illustrated in FIG. 3 are also shown in the following pseudo code, which should be clear without additional explanation in view of the description above:

```
Display an Enter screen providing
  a menu of options;
Receive customer selection;
Verify that customer selection is valid;
Execute the customer selection menu choice;
End.
```

The processing steps involved with the execution of the menu selection will be better understood with reference to the following data flow diagrams and pseudocode.

Figure 5:
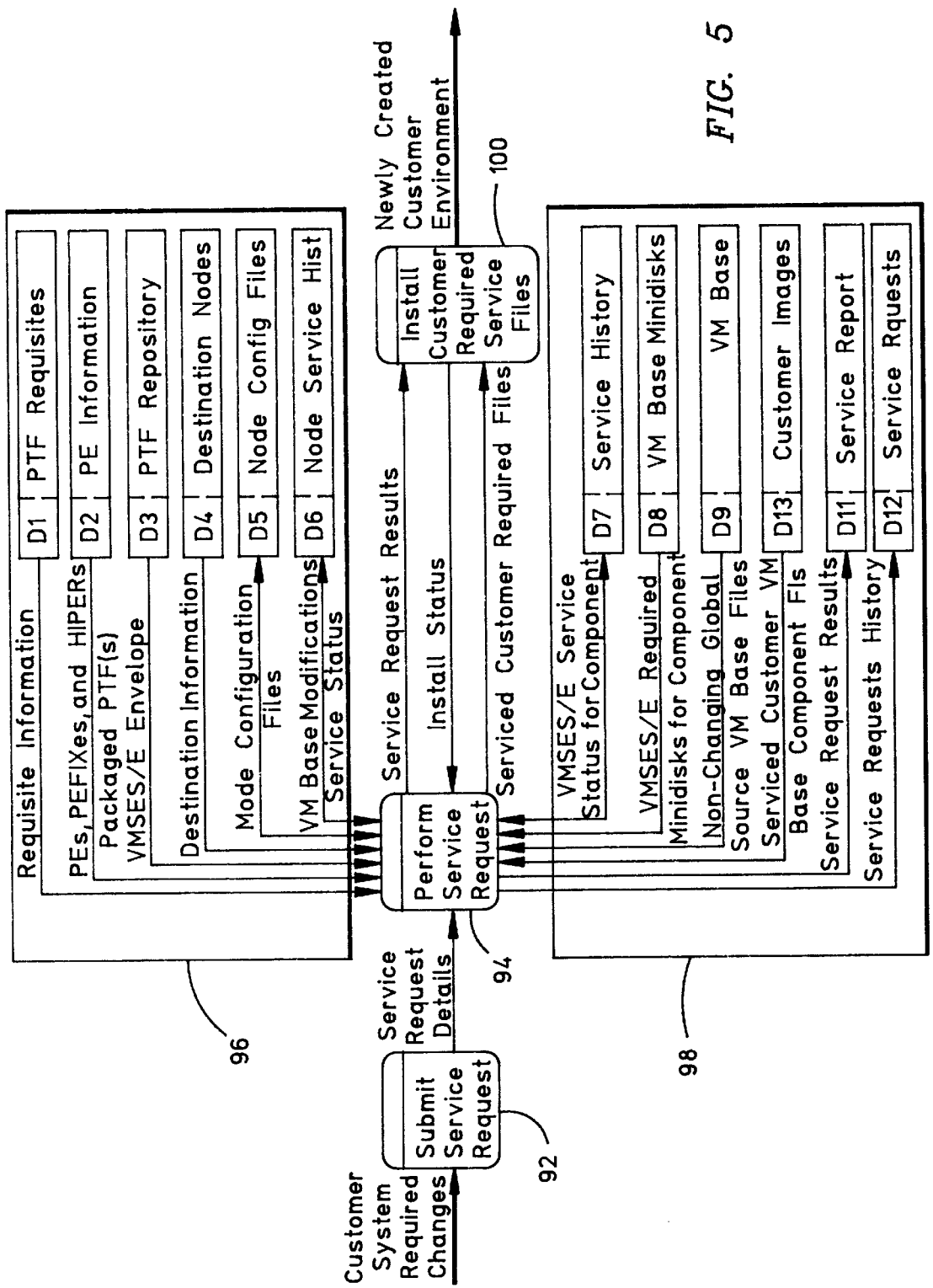
FIG. 5 is a data flow diagram that illustrates further processing of the system illustrated in FIG. 1.

The first data flow diagram, FIG. 5, shows the overall processing involved in fulfilling a customer (end customer) service request. The first step comprises receiving customer system required changes at the front end, as described above, and producing service request details after validation and formatting. This processing step is represented in the data flow diagram by the diagram box numbered 92. Next, the service request details are provided to the service facility at the flow diagram box numbered 94, which then performs the service request. FIG. 5 shows that the service facility receives and updates system configuration information and update changes from data repositories identified by the flow diagram box numbered 96. Such data repositories can comprise, for example, direct access disk storage devices (DASDs) connected to the central node.

The repositories 96 are illustrated in FIG. 5 as comprising a first group of "PTF Requisites" designated D1, which is a list of all the types of requisite service necessary to be applied prior to applying a specific piece of service, which is commonly referred to as a Program Temporary Fix ("PTF"). Another repository group is designated D2, "PE Information", and comprises a service-with-error list that includes a listing of service with errors and the subsequent service fix for the error. The next repository is labelled "PTF Repository" designated D3 and comprises a list with associated information concerning the PTFs, such as whether PEs (listed in D2) exist. A "Destination Node" repository, D4, contains a list of all valid target system nodes comprising remote locations and end customers of the network 18, what programs reside on the nodes, status information, and update information for each node. Accordingly, the next repository is that of "Node Configuration Files," D5, which is a set of files for each software product that is used to tailor the product for a particular customer. Finally, a D6 repository called "Node Service History" provides a product image service level history including the PTFs applied, the date of applying, the current service level for the software product, and similar information.

FIG. 5 also shows a generalized input/output operation represented by the flow diagram box numbered 98. This diagram box represents a number of operations, including a log of service requests, the service history of the program product for which service is requested, data files for use by the operating system of the service facility, service request reports, and customer specified image files from which the service facility determines the nature of the service to be provided. These operations are described in greater detail below.

FIG. 5 indicates that serviced customer-required files are provided for installation at the remote location, as represented by the flow diagram box numbered 100. FIG. 5 also shows that the service facility provides a Service Request Results Report that keeps the customer informed as to the operations that were performed at the service facility. Lastly, the remote location provides information on the installation status back to the service facility, as indicated by the arrow leading from the Install box numbered 100 back to the Perform box numbered 94. The status indicates whether the installation of the serviced files was completed satisfactorily.

Figure 6:
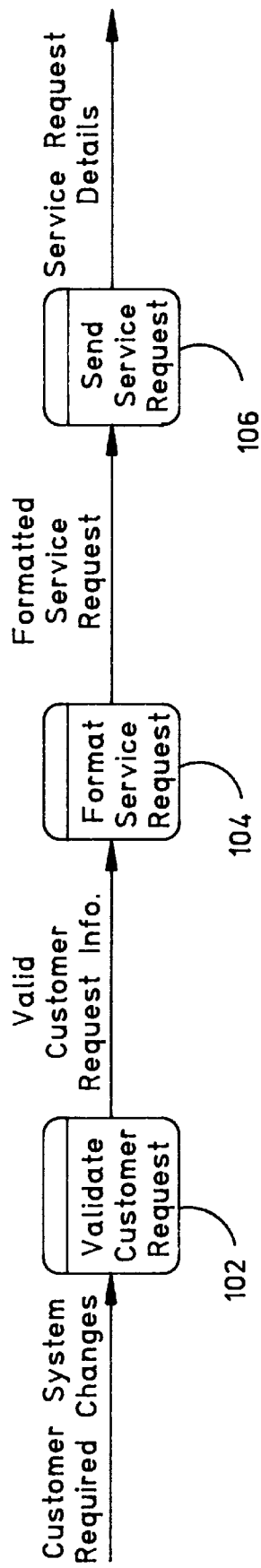
FIG. 6 is a data flow diagram that illustrates in greater detail the processing of the Submit Service Request function illustrated in FIG. 5.

FIG. 6 is a data flow diagram that illustrates the Submit Service Request processing step (represented by the FIG. 5 flow diagram box numbered 92) in greater detail. The first processing step begins with the receipt of customer system required changes in the form of a service request, indicated as the FIG. 6 flow diagram box numbered 102. After the validation of the customer request, such as described above, the next process to be performed is to format the service request. This formatting is performed by the software maintenance system front end that is resident at the remote location. This processing step is represented by the flow diagram box numbered 104. It should be understood that validation and formatting are implementation specific according to a particular processing system and protocol. Thus, such details will be understood by those skilled in the art without further explanation. Next, the formatted service request is sent over the network, as represented by the flow diagram box numbered 106, thereby providing the service request details to the service facility at the central site.

Part of the processing of the front end in receiving a customer service request is to permit the customer to configure a customer product image profile. Such a configuration step permits the customer to specify product information concerning the software program product that is to be updated, the identification of the customer, and options relating to the type of program updates that will be incorporated into the changed program product. For example, FIG. 7 shows a screen labelled "CFG1" to illustrate a first customer configuration screen, which illustrates the type of information gathered by the front end. FIG. 8 is labelled "CFG2" and illustrates a second screen that shows further details of the information gathered by the front end. In the second screen, "HIPERS" refers to very important program changes that are generally viewed as essential for updates. The phrase "PE" refers to a program fix having an identified error, which may or may not have been subsequently solved. The phrase "PEFIX" refers to a fix made to a PE. The phrase "Pre-Requisites" refers to certain predetermined data files necessary before an update can be performed. The phrase "Co-Requisites" refers to files that must be available simultaneously with any particular update. Finally, the phrase "Hard Reqs" refers to any requisites specified by the customer. For example, a customer may be aware of particular fixes that the customer wants to identify by name to be certain of incorporation.

Figure 9:
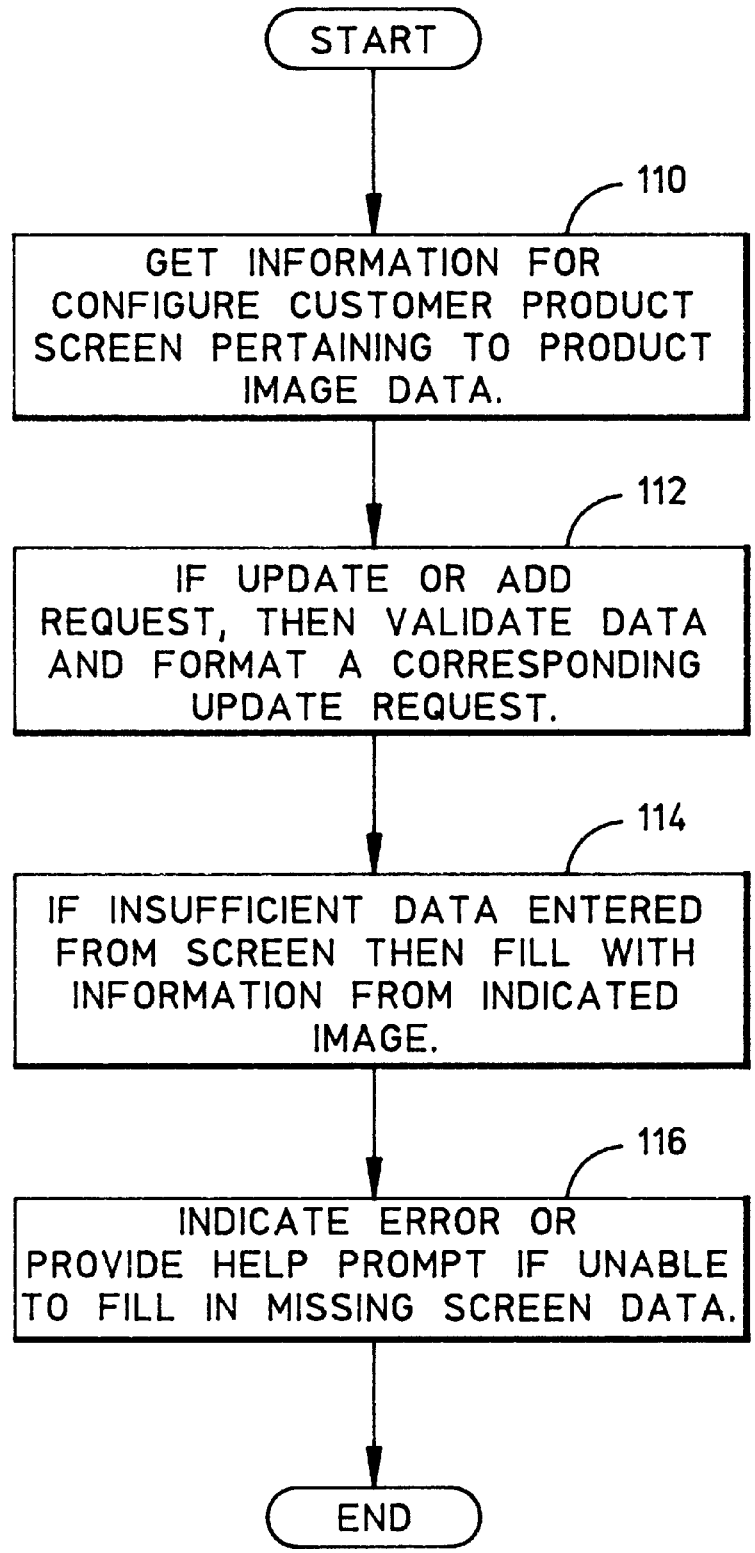
FIG. 9 is a flow diagram that illustrates the processing of the system in carrying out the Configure Customer Product Image Profile function illustrated in FIGS. 7 and 8.

The processing steps followed by the system in carrying out the Configure Customer Product Image Profile function of the execution processing shown in FIG. 3 can be better understood with reference to the flow diagram of FIG. 9. In the first step of processing, represented by the flow diagram box numbered 110, the front end interactively receives information for the Configure Customer Product screen. This information includes what is known as the product identifier (called the "prodid" or "prod ID"), which is the name or title designation by which the program product is referred. The prod ID is the designation given to the program product by the product vendor and is not changed by the customer. A customer at a remote location can tailor a particular instance or copy of the program product for use at that remote location, or can include multiple copies of the same program product at the remote location. A particular customer copy of the program product is designated by a corresponding image identifier that is defined by the customer. The product identifier and image identifier together uniquely designate a particular software program product and are referred to as the customer-defined "product image".

If necessary, the system waits at the processing step represented by the flow diagram box numbered 110 for the customer to provide screen input through the keyboard at the remote location, or waits for the customer to cancel the configuration request, or waits for a valid add/update/delete request from the screen input. At the next step, indicated by the flow diagram box numbered 112, the system validates any update or add request received from the customer and prepares a corresponding update request with the proper format for transmission to the service facility at the central site.

At the FIG. 9 flow diagram box numbered 114, the system responds to an insufficient entry of screen input by filling in the missing information from the indicated program product image supplied by the customer. The information that the system requires can be determined, in relation to the preferred embodiment, with reference to the blank lines displayed in the FIG. 8 sample display screen. If the system cannot determine the nature of the product that the customer wishes to configure, then it indicates an error or provides a suggestion in the form of a list (as indicated by the list function F4 shown at the lower edge of FIG. 8) or displays a help menu. If a cancel or exit command is received, then the action by the system is to exit to the previous display screen or exit the program, respectively.

The processing exemplified by the FIG. 9 flow diagram also is reflected in the following pseudo code:

```
If the customer selection is Configure Customer
   Product Image Profile
   then
   Do
      Display the screen with known
         customer information
      until
         an exit request (from application) or
         a cancel request (to previous screen) or
         a valid add/update/delete request is
            received;
      If an update or add request is received
         then
         Do
            Validate the data entered as
               being valid
            If the data entered is valid
               then format a Customer
                  Profile Update Request,
                  send it to the central
                  data base update
                  program, and update
                  appropriate data bases;
                  Exit to previous
                  screen;
               else display invalid field
                  help;
            End;
      If enter and the product image are
         not blank and all other fields
         are blank,
```

-continued
```
            then search for the image indicated
               and fill in blanks;
         If enter and all fields are blank
            then suggest F4 for a list of
               existing images;
         If help request
            then display help depending on
               cursor location
         If cursor is on a field
            then field help
            else general help;
         If cancel/previous request
            then exit to previous screen;
         If exit request
            then exit the application;
   End.
```

The processing exemplified by the pseudo code should be apparent to those skilled in the art, in view of the flow diagram and discussion above, without further explanation.

Another option presented to the customer in the Entry screen (FIG. 4) is to configure a software product. The screen displayed on the video monitor of a customer is illustrated in FIG. 10 and is identified as "CFG5. " The display screen of FIG. 10 shows that the front end permits a customer to configure software product files that determine how the program product to be updated will run in a production environment. In FIG. 10, an exemplary file name of "PROFILE" is shown for purposes of illustration only. The processing of this option will be better understood with reference to the flow diagram of FIG. 11 and the discussion below.

Figure 11:
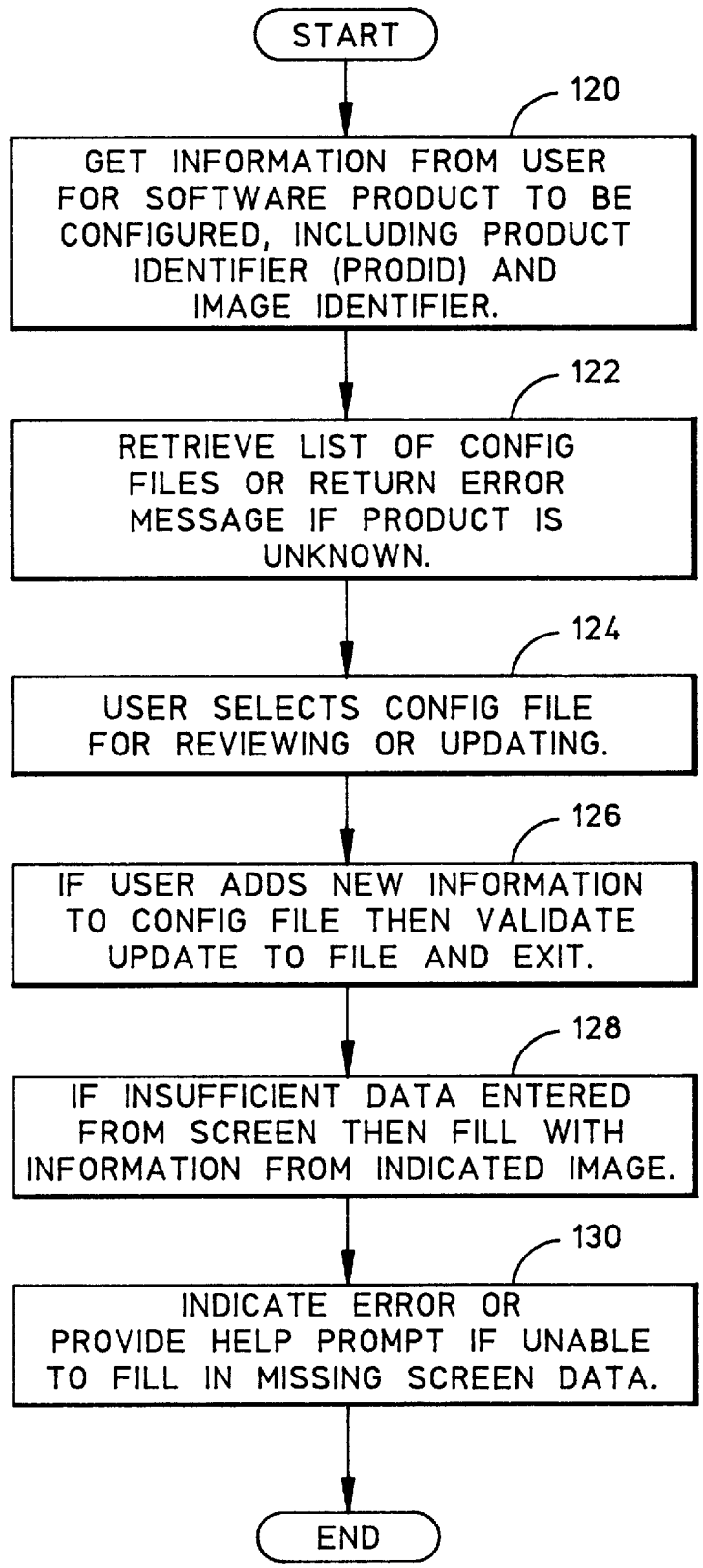
FIG. 11 is a flow diagram that illustrates the processing of the system in carrying out the Configure Software Product function illustrated in FIG. 10.

The first step of processing in the Configure Software Product processing is represented by the FIG. 11 flow diagram box numbered 120, which shows that the system interactively receives information from the customer via the input screen 24a for the software product to be configured, including the product image comprising the product identifier (the "prod ID") and the image identifier referred to above. At the next step, indicated by the box numbered 122, the system retrieves a list of configuration files or returns an error message if the product information provided by the customer does not identify a known product. At the next processing step the customer selects a configuration file for viewing or for updating, as represented by the flow diagram box numbered 124. In the preferred embodiment, the configuration files are maintained at the central site. The system then checks for any added information and, if the customer adds new information to the configuration file the system validates it and exits the routine. This processing is represented by the flow diagram box numbered 126.

The next step illustrated in FIG. 11 is indicated by the box numbered 128 and shows that the system determines if insufficient data has been entered interactively from the screen 24a. If possible, the system fills in the missing information from the identified product image. If the system cannot provide the missing information, then at the box numbered 130 it indicates an error or provides a suggestion in the form of a list (as indicated by the list function F4 shown at the lower edge of FIG. 8) or displays a help menu. If a cancel or exit command is received, then the action by the system is to exit to the previous display screen or exit the program, respectively.

The processing of this option will be better understood with reference to the pseudo code below:

```
If the selection is Configure Software Product
   then
   Do
      Display the input screen until
         an exit request (from application) or
         a cancel request (to previous screen) or
         a valid add/update/delete request is
            received;
      If customer has previously been at this point
         then display the list of software product
            configuration files from the
            last session;
         else
         Do
            Customer enters a software product
               image identifier;
            If this is a valid software product
               image identifier
               then retrieve a list of product
                  configuration files for the
                  specified software product
                  image with their current
                  and intended locations;
               else give a message of "unknown
                  software product";
         End.
      Customer selects a software product
         configuration file to view or update;
      Customer can add a new product
         configuration file;
      If an update request is submitted (by
         editing a file)
         then
         Do
            If the data entered is valid
               then format a Customer
                  Profile Update Request;
                  Send it to the central data
                  base update program; and
                  exit to previous screen;
               else display invalid field help;
         End.
      If enter and the product image are
         not blank and all other fields are
         blank
         then search for the image indicated
            and fill in blanks;
      If enter and all fields are blank
         then suggest F4 for a list of existing
            images;
      If help request
         then display help depending on
            cursor location;
               If cursor is on a field
                  then field help
                  else general help;
      If cancel request
         then exit to previous screen;
      If exit request
         then exit the application;
   End.
```

The processing exemplified by the pseudo code should be apparent to those skilled in the art in view of the discussion above without further explanation.

The next option provided by the Enter screen of FIG. 4 is to research and apply a software product service. If this option is selected, then the preferred embodiment displays a screen such as illustrated in FIG. 12 to the customer. It should be apparent that the information supplie d by the customer in response to the screen provides information necessary to perform service research and to apply the service to a predetermined software product. The processing of this option will be better understood with reference to the flow diagram of FIG. 13 and the discussion below.

Figure 13:
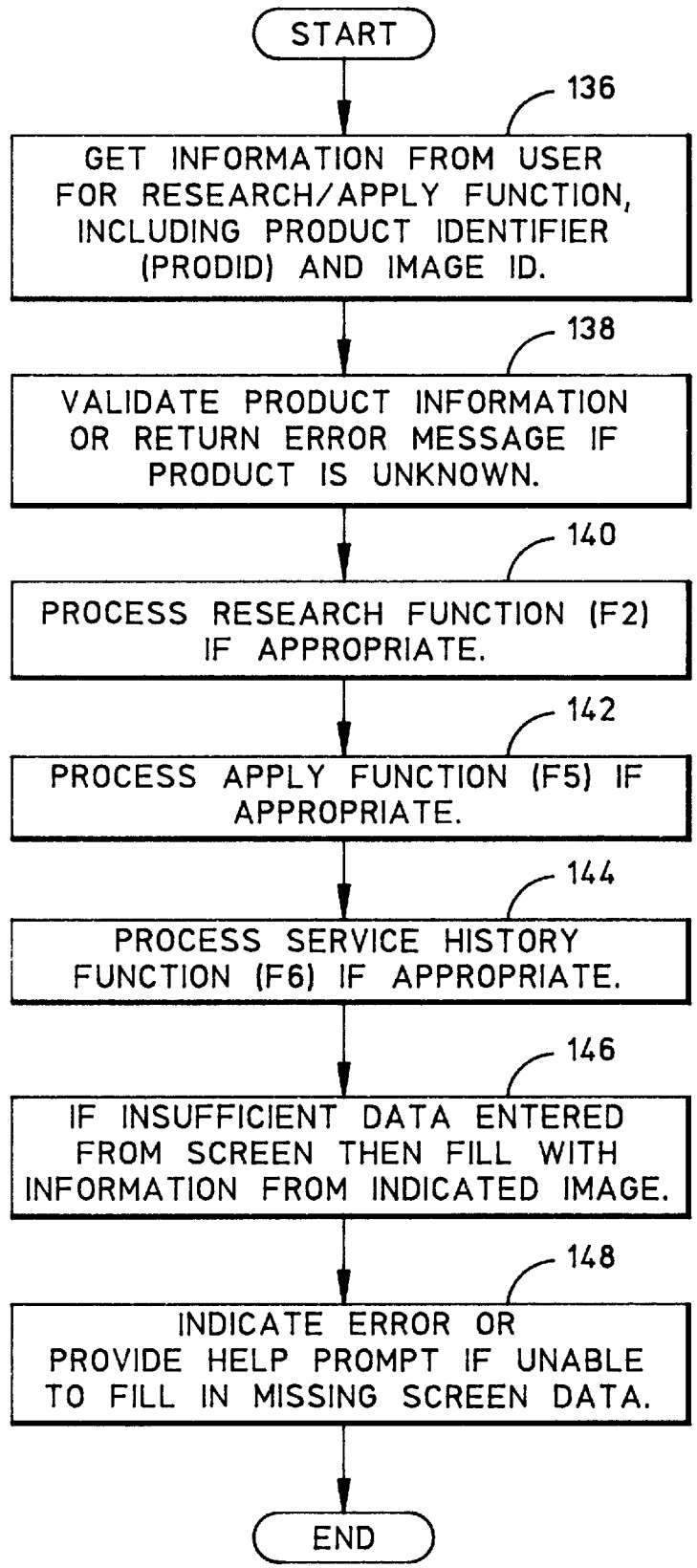
FIG. 13 is a flow diagram that illustrates the processing of the system in carrying out the Research and Apply Product Service function illustrated in FIG. 12.

In the first processing step of FIG. 13, represented by the flow diagram box numbered 136, the front end retrieves information from the Research and Apply a Software Product Service screen. If necessary, the system waits for the customer to interactively provide screen input through the keyboard at the remote location, or waits for the customer to cancel the research request, or waits for a valid research/apply request from the screen input. At the next step, indicated by the flow diagram box numbered 138, the system validates any software product image received, comprising a product identifier (prod ID) and image identifier, and retrieves related product information to perform the research or apply the service.

As is apparent from the screen display illustrated in FIG. 12, the customer can press function buttons to select between a Research (F2), Apply (F5), or History (F6) operation. A selection of Research results in the system validating the entered data, formatting a research request, and sending the research request on to the service facility or an equivalent research processor. An invalid entry will result in the display of an error message or a help prompt. This processing is represented by the flow diagram box numbered 140. It should be understood that the exact format of the research request is not critical to the function of the system. Rather, the advantage provided by the preferred embodiment of the invention is in providing the same format, as the system designer may choose it to be, so that the software maintenance function can be performed across different platforms and programs with the same format and therefore the same interface.

If the Apply function (F5) is selected, then the system validates the interactively entered data, formats the research and apply request, and provides it to the service facility, as represented by the flow diagram box numbered 142. If the History function (F6) is selected, then the system again validates the entered data before formatting a service history request and providing the request to the service facility. This processing is represented by the flow diagram box numbered 144.

Next, as indicated by the flow diagram box numbered 146, the system determines if insufficient data has been entered interactively from the screen. If possible, the system fills in the missing information from the identified product image. If the system cannot provide the missing information, then at the box numbered 148 it indicates an error or provides a suggestion in the form of a list (as indicated by the list function F4 shown at the lower edge of FIG. 8) or displays a help menu. If a cancel or exit command is received, then the action by the system is to exit to the previous display screen or exit the program, respectively.

The processing steps carried out by the front end in gathering this information will be better understood with reference to the following pseudocode.

```
If selection is Research and Apply Software
   Product Service
   then
   Do
      Display the screen (initialized with last
         session values)
         until
         an exit request (from application) or
         a cancel request (to previous screen) or
         a valid research and/or apply request
            is received;
      If customer has previously been at this point
         then display the previous research/apply
            information
         else
```

```
      Do
         Customer enters research/apply information;
         If this is a valid software product/image
              identifier
            then retrieve related information
              for the specified software
              product image
            else give a message of unknown
              software product;
      End.
```

The box 140 Research function processing is illustrated in pseudo code as follows:

```
If F2 (Research) is pressed
   then
      Do
         Validate the fields entered;
         If the data entered is valid
            then
               Do
                  Format a research request;
                  Send the research request to
                    the service facility or
                    equivalent request processor;
               End;
            else display invalid field help;
      End.
```

The box 142 Apply function processing is illustrated in pseudo code as follows:

```
If F5 (Apply) is pressed
   then
      Do
         Validate the fields entered;
         If the data entered is valid
            then
               Do
                  Format a research and apply
                    request;
                  Send the research and apply
                    request to the service facility
                    or equivalent request
                    processor;
               End;
            else display invalid field help;
      End.
```

The box 144 History processing is illustrated in pseudo code as follows:

```
If F6 (History) is pressed
   then
      Do
         Validate the fields entered;
         If the data entered is valid
            then
               Do
                  Format a Service History Request;
                  Send the Service History Request
                    to Service facility or equivalent
                    request processor;
               End;
            else display invalid field help;
      End.
```

The processing of flow diagram boxes 146 and 148 is illustrated in pseudo code as follows:

```
If enter and the product image are not
   blank and all other fields are blank
   then search for the image indicated
      and fill in blanks;
If enter and all fields are blank
   then suggest F4 for a list of existing images;
If help request
   then display help depending on cursor location;
      If cursor is on a field
         then field help
         else general help;
   If cancel request
      then exit to previous screen;
   If exit request
      then exit the application;
End.
```

The processing exemplified by the pseudo code should be apparent to those skilled in the art, in view of the flow diagram and discussion above, without further explanation.

The fourth option provided by the Enter screen of FIG. 4 is to install serviced software product files. FIG. 14 illustrates the type of screen displayed by the front end so that appropriate information can be interactively gathered from the customer to permit the installation of serviced software product files. The processing of this option will be better understood with reference to the flow diagram of FIG. 15 and the discussion below.

Figure 15:
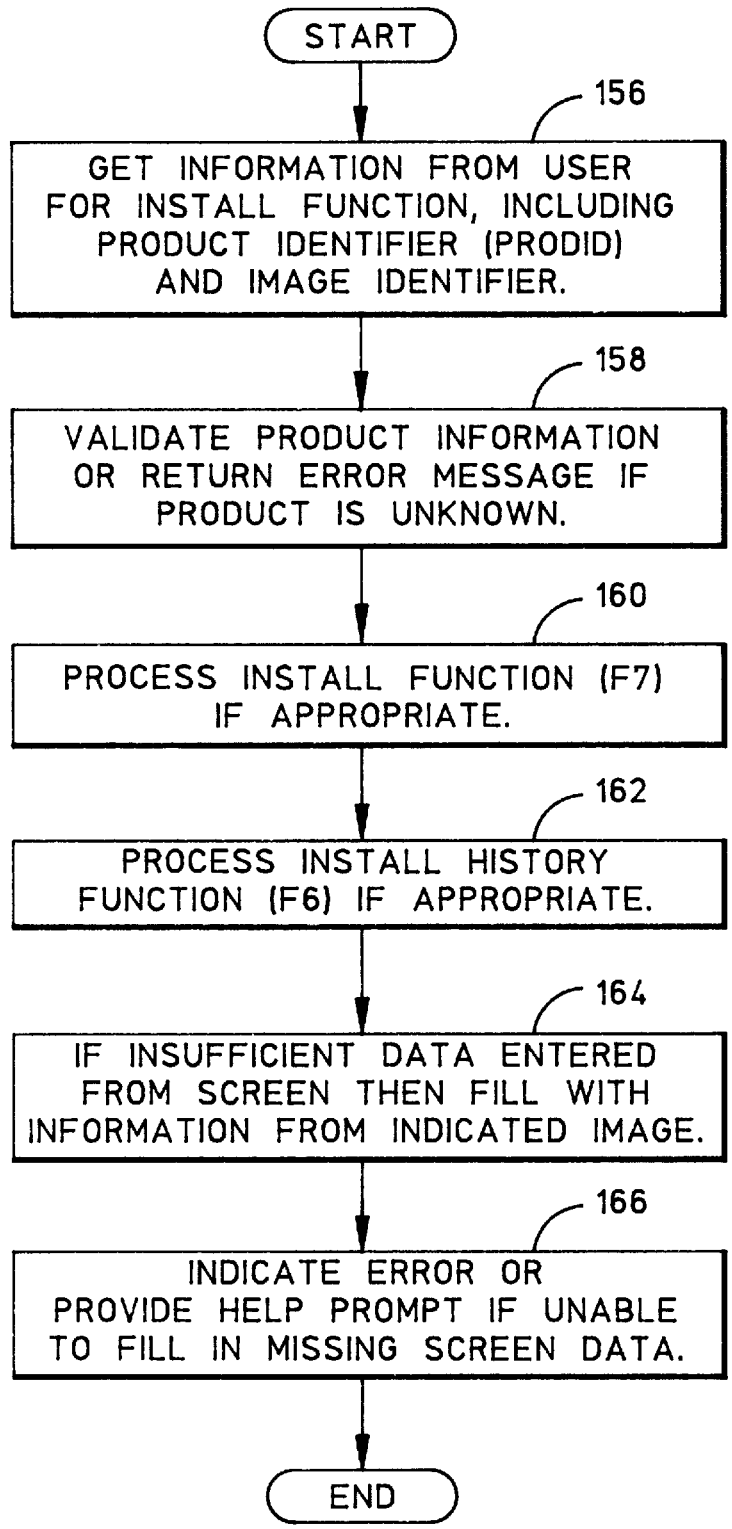
FIG. 15 is a flow diagram that illustrates the processing of the system in carrying out the Install Serviced Software Product Files function illustrated in FIG. 14.

In the first processing step of FIG. 15, represented by the flow diagram box numbered 156, the front end interactively receives information for the Install Serviced Software Product Files screen. If necessary, the system waits for the customer to interactively provide screen input through the keyboard at the remote location, or waits for the customer to cancel the request, or waits for a valid request from the screen input. At the next step, indicated by the flow diagram box numbered 158, the system validates any product image identifier received and retrieves related product information to perform the installation.

As is apparent from the screen display illustrated in FIG. 14, two of the options presented to the customer are to press function buttons to select between an Install (F7) and a History (F6) operation. A selection of Install results in the system validating the entered data, formatting an install request, and sending the install request on to the service facility or an equivalent installation processor. Those skilled in the art will appreciate that the installation process is dependent on the particular operating system implementation. Thus, details of the installation process will be known to those skilled in the art without further explanation. An invalid screen entry will result in the display of an error message or a help prompt. This processing is represented by the FIG. 15 flow diagram box numbered 160.

If the History function (F6) is selected, then the system validates the entered data, formats the installation history request, and provides it to the service facility, as represented by the FIG. 15 flow diagram box numbered 162. The installation history operation provides the sequence of changes, fixes, and updates applied to the identified software program product image identifier. As with the Install operation, the processing of the installation history operation is implementation dependent and should be known to those skilled in the art without further explanation.

Next, as indicated by the flow diagram box numbered 164, the system determines if insufficient data has been entered interactively from the screen. If possible, the system fills in the missing information from the identified program product image. If the system cannot provide the missing information, then at the box numbered 166 if indicates an error or provides a suggestion in the form of a list (as indicated by the list function F4 shown at the lower edge of FIG. 14) or displays a help menu. If a cancel or exit command is received, then the action by the system is to exit to the previous display screen or exit the program, respectively.

The processing steps carried out by the system in performing the installation function will be better understood with reference to the following pseudocode:

```
If the selection is Install Serviced
    Software Product Files
    then
    Do
        Display the input screen
        until
            an exit request (from application) or
            a cancel request (to previous screen) or
            a valid install request is received;
        If customer has previously been at this point
            then display the previous installation
                information
            else
            Do
                Customer enters installation information;
                If this is a valid product image identifier
                    then retrieve related information
                        for the specified software
                        product image
                    else give a message of
                        "unknown software product";
    End.
```

The box 160 Install function processing of FIG. 15 is further illustrated in the following pseudo code, which causes the install request to be formatted and sent to the service facility:

```
If F7 (Install) is pressed
    then
    Do
        Validate the fields entered;
        If the data entered is valid
            then
            Do
                Format an install request;
                Send the install request to the
                    service facility or
                    equivalent request processor;
            End;
            else display invalid field help;
    End.
```

The box 162 Installation History function processing is further illustrated in the following pseudo code, which causes the proper request to be formatted and sent to the service facility over the network:

```
If F6 (History) is pressed
    then
    Do
        Validate the fields entered;
        If the data entered is valid
            then
            Do
```

-continued

```
                Format an Install History Request;
                Send the Install History Request
                    to the service facility or
                    equivalent request processor;
            End;
            else display invalid field help;
    End.
```

The processing of boxes 164 and 166 of FIG. 15 are further illustrated by the following pseudo code:

```
If enter and the product image
    identifier are not blank and all
    other fields are blank
    then search for the image indicated
        and fill in blanks;
If enter and all fields are blank
    then suggest F4 for a list of existing
        images;
If help request
    then display help depending on
        cursor location;
        If cursor is on a field
            then field help
            else general help;
If cancel request
    then exit to previous screen;
If exit request
    then exit the application;
End.
```

The processing exemplified by the pseudo code should be apparent to those skilled in the art, in view of the flow diagram and discussion above, without further explanation.

Finally, the last option provided by the Enter screen of FIG. 4 is to perform research, apply service, and install the resulting product. In the case of this option, the front end displays the screen illustrated in FIG. 12 and operates according to the steps illustrated in FIG. 13. Thus, the system waits for either an exit request from the application program, a request cancellation from the customer, or receipt of an installation request from the customer. All other operations are as for the research and apply service option except if the installation option is selected by the customer. In the case of the installation option being selected, then the Install Serviced Software Product screen of FIG. 14 is displayed and the processing for that option as illustrated in FIG. 15 is followed. The following pseudo code illustrates the processing for this option:

```
If the selection is Research, Apply Service, and Install
    then
    Do
        Display the Research and Apply
            Service input screen with F7 = Install
            displayed
        until
            an exit request (from application) or
            a cancel request (to previous screen) or
            a valid install request is received;
        If customer has previously been at this point
            then display the previous installation
                information
            else
            Do
                Customer enters installation information;
                If this is a valid product image identifier
```

```
            then retrieve related information
               for the specified software
                  product image
            else give a message of "unknown
                  software product";
         End.
    Perform all processing the same as Research and
      Apply Service
    Except
    If F7 (Install) is pressed
       then
       Do
          Display the Install Service Software
             Product screen;
          Follow the processing for Install Service
             Software;
       End;
    End.
```

The processing exemplified by the pseudo code should be apparent to those skilled in the art, in view of the flow diagram and discussion above, without further explanation.

Figure 16:
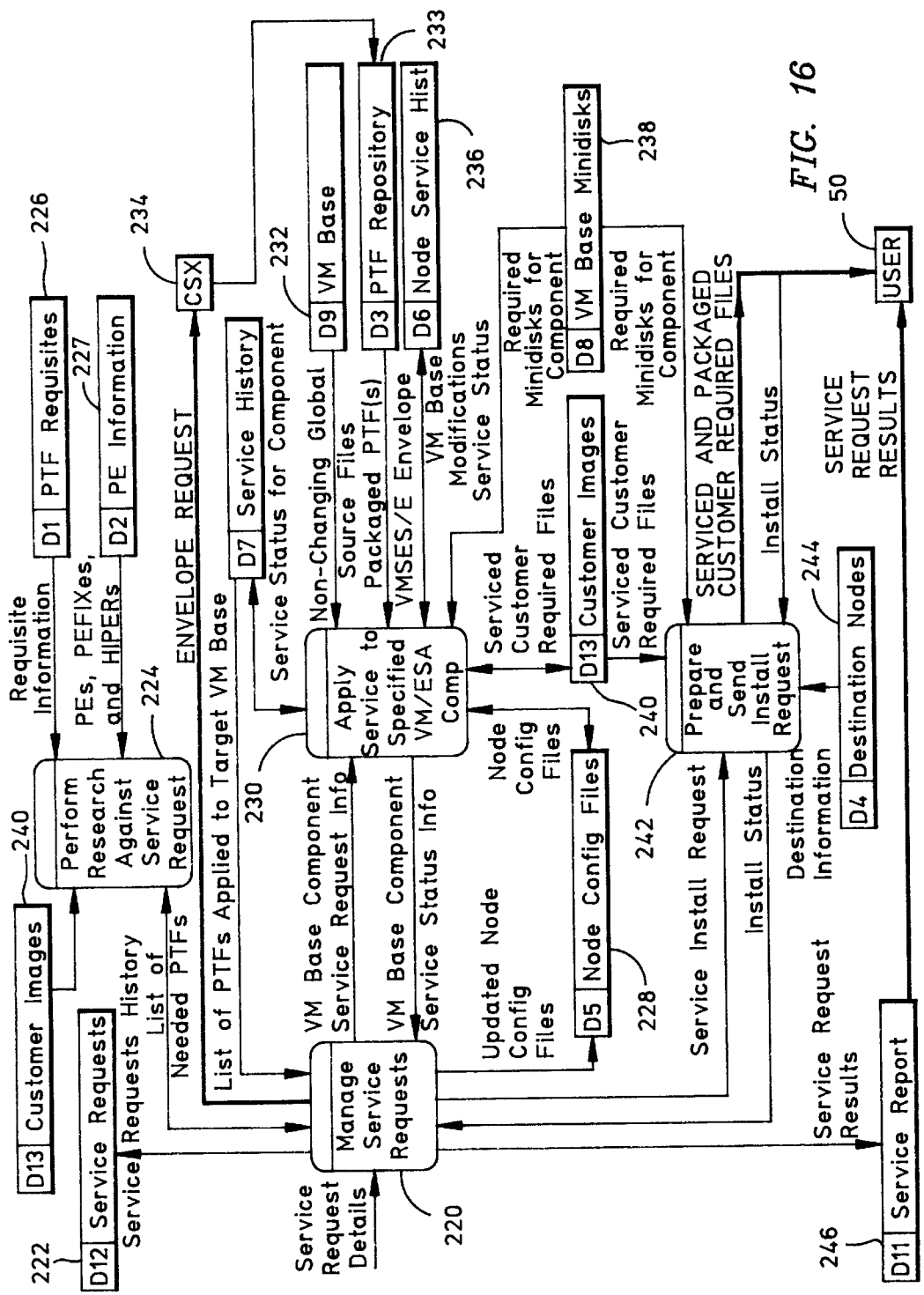
FIG. 16 is a data flow diagram that illustrates in greater detail the processing of the Perform Service Request function illustrated in FIG. 5.

After the service request is validated and formatted, it is sent over the network to the service facility. When the service facility receives the service request details, it then performs the service request, as identified by the flow diagram box numbered 94 in FIG. 5. FIG. 16 is a data flow diagram comprising the diagram box numbered 94 shown at a next level of detail. The boxes containing the letter "D" followed by a number indicate a data file. Other flow diagram boxes indicate processes.

In the first diagram box of FIG. 16 numbered 220, the service request details are received at the service facility, which manages the service requests. As indicated by the diagram box numbered 222, a history of the service requests received from the customer is maintained in the storage devices of the service facility. The flow diagram box numbered 224 indicates that research is performed by the research processor of the service facility to determine the list of needed fixes, also referred to as program temporary fixes (PTF) relative to the service request received from the customer. The diagram box numbered 226 indicates requisite information, and the box numbered 227 indicates information concerning PEs, PE fixes, and HIPERs, are used in performing the service research.

The data flow diagram box numbered 228 indicates that node configuration file data comprising configuration details for a given product at a given customer remote location are received at the central site with the service request details. The FIG. 16 flow diagram also indicates that a configuration is updated by receiving from a second processing step numbered 230, the results of the service application. That is, in managing the service request, the processing step represented by the flow diagram box numbered 230 is to apply the service to a specified computer program product and to incorporate the applicable configuration files into the serviced product.

The flow diagram box numbered 232 represents the software product base code that never changes and is identified as "VM Base" data. The unchanging code provides a baseline, or reference, to which subsequent fixes can be applied. Thus, the unchanging code is used as a base on which to build serviced product. The flow diagram box numbered 233 represents the PTF repository of program fixes. FIG. 16 indicates the VM Base files and the PTF files are provided to a service routine identified as "CSX" and represented by the flow diagram box numbered 234. In addition, the flow diagram box numbered 236 indicates that the node service history at the remote location is updated as part of the application of the service in the box numbered 230.

The flow diagram box numbered 238 represents the product files being updated and represents the source code to which changes are applied. As noted above, the source code is not resident at the remote location and is kept only at the service facility at the central site. The flow diagram box numbered 240 indicates the customer-defined product image information is used in applying the service to the computer program product. In this way, the service is applied in accordance with the desires of the remote location customer. It should be apparent that such information also is needed by, and is provided to, the processing step represented by the flow diagram box numbered 242, which indicates that the installation request is prepared and sent. It also should be apparent that such information is needed by, and is provided to, the processing represented by the flow diagram box numbered 224. Destination node information is provided in the processing step numbered 244. Finally, a service report is prepared at the flow diagram box numbered 246 and is a summary of the service research and installation.

The processing steps followed by the system corresponding to the data flow diagram of FIG. 16 will be better understood with reference to the following pseudocode. First, the processing of the flow diagram box numbered 220 is exemplified as follows:

```
    If a request is received
       then
       Do
          Examine the request and determine
             the request type;
          Coordinate execution of each request
             based on the nature of the request;
```

The next portion of pseudo code further illustrates the processing of the flow diagram box numbered 220 in formatting a research request, which is provided to the processing represented by the box 224:

```
    If the request is for Research
       then
       Do
          Format a research request;
          Place a list of needed PTF's
             in the request;
          Identify the parameters for
             performing research;
          Send the research request;
          Wait for search results and process
             other requests in the interim;
          If the search results arrive in a
             predetermined reasonable
             amount of time
             then
             Do
                Check for problems
                   including was the report
                   created, is it a valid
                   report, is there
                   information in the report
                   indicating problems;
                If problems exist
                   then detail problems in
                      a request report;
                   else detail status information
                      in a request report;
                If the research request report
```

```
                    was created
                then send research request
                    report to requestor
                else tell requestor problems
                    with fulfilling request;
        End;
    End.
```

The next section of pseudo code further illustrates the processing in changing the data structures corresponding to the boxes 226 and 227 of FIG. 16:

```
    For each PTF in the list of requested PTFs:
        Do
            Identify all requisite service as indicated
                either at the time of the request or
                in the product image profile (default),
                where an interactive request overrides
                the profile;
        End.
        Repeat the above for all newly identified PTFs
            until no more identified (requisites, PE Fixes,
            PEs, Open PEs) exist.
        Identify all HIPERs if specified either at request
            time or in customer's product image profile;
        If the list is "ALL" or a specific level is indicated
            then perform the appropriate research for
            the matching PTFs.
```

The processing exemplified by the pseudo code above should be apparent to those skilled in the art, in view of the flow diagram and discussion above, without further explanation.

The processing steps followed by the service facility in performing service research should be well-known to those skilled in the art without further explanation. Moreover, it should be understood that the exact implementation of the research request is not critical to the function of the system. Rather, the advantage provided by the preferred embodiment of the invention is in providing the same research request format, as the system designer may choose it to be, so that the software maintenance function can be performed across different platforms and programs with the same format and therefore the same interface. Nevertheless, the processing steps performed in the flow diagram box numbered 220 in generating a service envelope request to the CSX box numbered 234 is exemplified by the following pseudo code:

```
    If the request is for an envelope of service files
        then
        Do
            Examine the service history
                database (D7) to determine
                what service already has been
                applied to the specified
                software product; the
                unapplied PTFs will be placed
                in the request;
            Format a service envelope
                generation request;
            Place a list of unapplied PTFs
                in the request;
            If the envelope is for the
                requestor
                then list the requestor as the
                    target
                else list the intended service
                    application program as the
                    target; this is determined by
                    examining a profile listing
                    where the service application
                    programs are and by
                    determining which ones are
                    not busy;
            Send the service envelope generation
                request;
            Wait for the search results (process
                other requests in the interim);
            If the search results arrive in a
                predetermined reasonable
                amount of time
                then
                Do
                    Check for problems including
                        was the report created, is
                        it a valid report, is there
                        information in the report
                        indicating problems;
                    If problems exist
                        then detail problems in a
                            request report;
                        else detail status information
                            in a request report;
                    If the research request report
                        was created
                        then send envelope request
                            report to requestor;
                End;
        End.
```

The next section of pseudo code exemplifies the processing carried out in the box 220 for generating service request information, which is provided to the processing of box 230:

```
    If the request is for service application
        to a product
        then
        Do
            Format a service application request;
                include the service envelope
                    request information;
                include the product name, image,
                    and the like;
            Send the service application request;
            Wait for search results (process
                other requests in the interim);
            If the search results arrive in a
                predetermined reasonable
                amount of time
                then
                Do
                    Check for problems
                        including was the service
                        history updated, are all
                        status indicators positive,
                        is there information in
                        the report indicating
                        problems;
                    If problems exist
                        then detail problems in
                            a request report;
                        else detail status information
                            in a request report;
                End;
        End.
```

The next section of pseudo code further illustrates the processing described above in connection with the changes to the data in box 240:

```
If the request is for Add/Update/Delete of Customer Product
    Image profile
    then
    Do
        Add/Update/Delete the image profile
            as request indicates;
        If the image is already there
            then notify the customer;
        Link/Access the resources containing
            the profiles;
        For an Add, create these resources;
        For a Delete, erase these resources;
        Wait for results (process other requests
            in the interim);
        If the results arrive in a predetermined
            reasonable amount of time
            then
            Do
                Check for problems including
                    did the Add/Update/Delete
                    complete, is the resulting file
                    in the correct format;
                If problems exist
                    then detail problems in a
                        request report;
                    else detail status information
                        in a request report;
            End;
    End.
```

The next section of pseudo code relates to the changes in data illustrated by the flow diagram box numbered 228:

```
If the request is for Add/Update/Delete of
    Product Configuration files
    then
    Do
        Add/Update/Delete the configuration
            files as request indicates;
        If the file is already there
            then notify the customer;
        Wait for results (process other requests
            in the interim);
        If the results arrive in a
            predetermined reasonable amount
            of time
            then
            Do
                Check for problems including
                    did the Add/Update/Delete
                    complete, is the resulting
                    file in the correct format;
                If problems exist
                    then detail problems in
                        a request report;
                    else detail status information
                        in a request report;
            End;
    End.
```

The next section of pseudo code relates to the processing of boxes 222 and 246 of FIG. 16:

```
Complete (generate) the Request Report and
Update the Logs;
Update the Service Requests Database;
Update the Service Reports Database;
Send the request report to the requestor;
Wait for next request.
```

The processing exemplified by the pseudo code above should be apparent to those skilled in the art, in view of the flow diagram and discussion above, without further explanation.

The processing steps followed by the service facility in applying the service to a particular program software product should be well-known to those skilled in the art without further explanation. Moreover, it should be understood that the exact implementation of the service application is not critical to the function of the system. Rather, the advantage provided by the preferred embodiment of the invention is in providing the same service request format, as the system designer may choose it to be, so that the software maintenance function can be performed across different platforms and programs with the same format and therefore the same interface. Nevertheless, the processing steps performed in the flow diagram box numbered 230 in applying the service to a program software product is exemplified by the following pseudo code:

```
Apply Service to Specified Software Product:
Compare the list of service in the envelope to
    what has been applied to this image of the
    product;
If all of the requested service has been applied
    then stop and record this information (no
    need to proceed);
Coordinate the following activities based on
    the status of each activity (Note: through
    the following steps no error stop processing
    and report error):
Set up the product servicing environment;
Access code listed in the customer image
    of the product;
Notify the requestor;
While service is available and no
    errors have occurred
    Do
        Receive the service envelope to the
            customer image of product
            repository locations;
            Update the Service History;
            Notify the requestor;
        Apply the serviced parts to the
            customer image of product;
        Re-apply Modifications;
        Update the Service History;
        Notify the requestor;
        Build the serviced customer image of
            product;
            Re-build with modifications
                included;
            Update the Service History;
            Notify the requestor;
    End.
Examine all logs for errors and report any
    warnings or errors.
```

The processing exemplified by the pseudo code should be apparent to those skilled in the art, in view of the flow diagram and discussion above, without further explanation.

Figure 17:
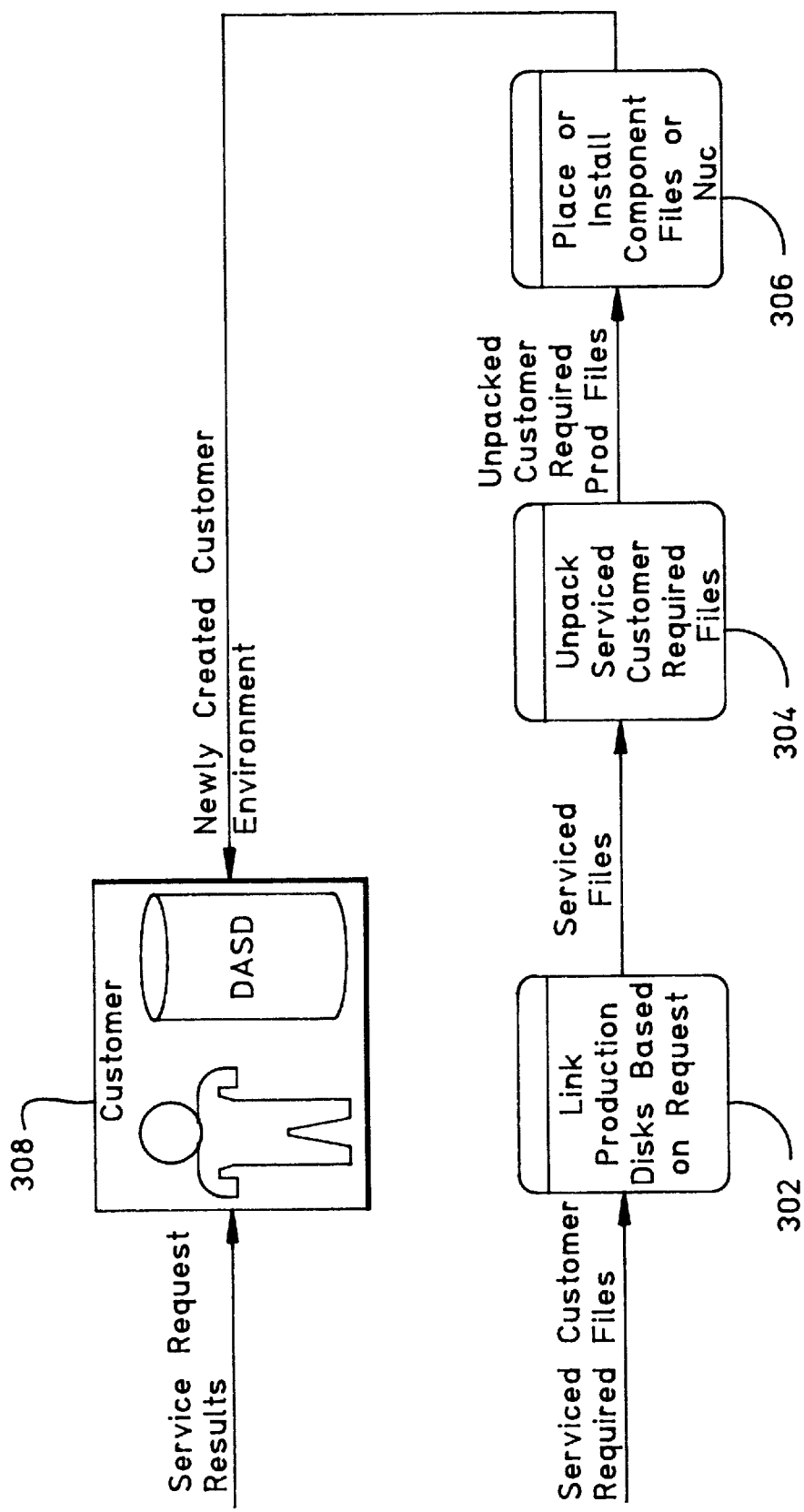
FIG. 17 is a data flow diagram that illustrates in greater detail the processing of the Install Customer Required Service Files function illustrated in FIG. 5.

After the service request is performed, the next step indicated by the flow diagram box numbered 100 in FIG. 5 is to install the customer required service files. The details of this process are illustrated in the data flow diagram of FIG. 17, which shows the serviced customer required files being received at a process represented by the flow diagram box numbered 302, which indicates that the production disk is linked based on the service request. The next step, as indicated by the flow diagram box numbered 304, is to unpack the serviced customer required files, which have been received over the network. The next step is to take the unpacked customer required production files and place or install them at the customer remote location, as represented by the flow diagram box numbered 306. This results in the newly created customer environment, which is incorporated into the direct access storage devices at the customer remote location, as represented by the flow diagram box numbered 308. In an alternative construction, the processing of the flow diagram box numbered 304 can include accessing the central site data base via a network connection to perform the installation otherwise performed by the box numbered 306. Finally, FIG. 17 indicates that the customer also receives the service request result report from the service facility.

The processing steps followed by the service facility in installing a software product on the remote location system should be well-known to those skilled in the art without further explanation. Moreover, it should be understood that the exact implementation of the product installation is not critical to the function of the system. Rather, the advantage provided by the preferred embodiment of the invention is in providing the same service request format, as the system designer may choose it to be, so that the software maintenance function can be performed across different platforms and programs with the same format and therefore the same interface. Nevertheless, the processing steps performed in the installation of the software product are exemplified by the following pseudo code:

Install a Specified Software Product on a Customer System

```
Look for an installation request;
If an installation request is found
    then look for the serviced software product
        files that are the delta between what is
        currently installed and what is new on
        the either serviced or modified version
        of the product.
If the serviced software product files (delta) are
        found
    then Link/Access the product resources
        based on request;
        Unpack the delta files;
        Add/update/replace the delta files over
            the existing files;
        Activate if indicated
        (the request should specify the mode of
        installation either into production
        or in test mode).
```

The system described above includes a central site of a network that first receives service requests, then references configuration files, base product files, and service files at the central site, and lastly returns requested service to requesting customers at remote locations. As noted above, however, the central site can be implemented in accordance with a distributed processing architecture in which the processing of the central site is not confined to a single processor, such as is illustrated in FIG. 1.

Figure 18:
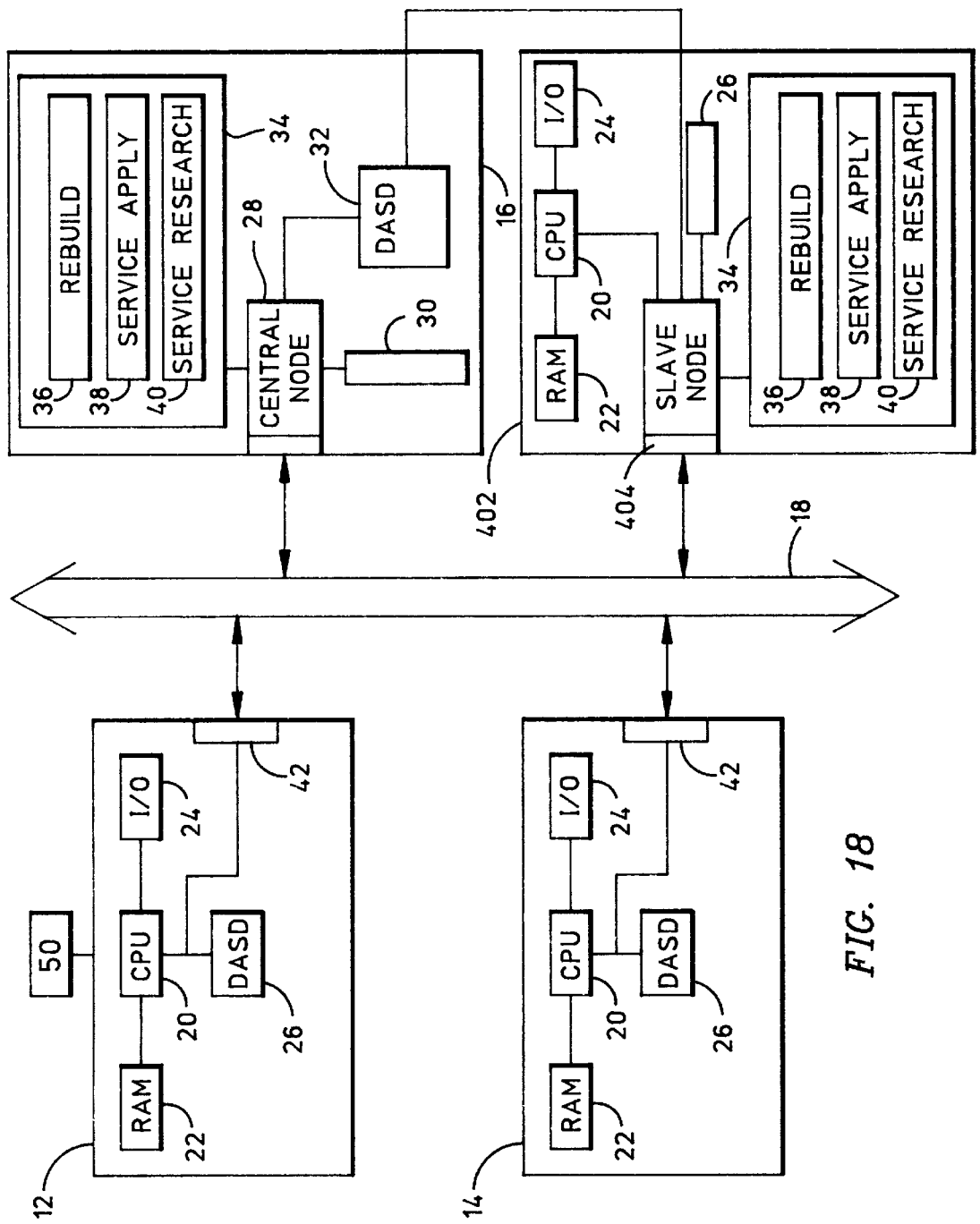
FIG. 18 is a block diagram of a computer network system constructed in accordance with a distributed architecture implementation of the present invention.

FIG. 18 is a block diagram representation of a computer network system 400 constructed in accordance with the present invention and having a distributed processing architecture. Comparison of the FIG. 1 system with the system illustrated in FIG. 18, in which like reference numerals refer to like structures, should make apparent the similar processing.

In the FIG. 18 distributed system, remote locations 12, 14 again communicate with a central processing site 16 over a network 18. The remote locations include a CPU 20, RAM 22, input/output devices 24, and a DASD 26. If desired, the remote location DASD 26 can contain product-specific configuration files, depending on the implementation selected and in accordance with the customer-defined product image. In the distributed system, the central site effectively comprises a central node processing site and one or more slave node processing sites communicating over the network and sharing the central site DASD 32, which is a data repository. FIG. 18 shows one of the slave processing sites 402 and illustrates that each slave processing site includes a processor 20, RAM 22, input/output devices 24, and a high-speed disk drive unit 26 to facilitate communication and control. FIG. 18 also shows that the slave processing site includes a service facility 34 like that shown at the central site 16. Thus, the service facility of the slave site 402 includes a rebuild processor 36, service apply processor 38, and a service research processor 40. A slave node unit 404 provides an interface to the network.

In the FIG. 18 distributed system, all service requests are directed to the central node control processor and network interface unit 28 at the central node processing site 16. The central node processor determines which of the service facilities should be given the task of handling the service request, either the service facility at the central site 16 or at a slave site 402. This determination is typically made according to which facility is not currently busy, but could depend on other implementation parameters as well, such as geographic location, specialized site capabilities, or others that will occur to those skilled in the art.

The processing of a service request, whether at the central site 16 or at a slave site 402, follows the processing steps described above in conjunction with the illustrations of FIGS. 2–17. For example, the processing step of the central node determining where to send a service request corresponds to the management processing represented by the FIG. 16 flow diagram box numbered 220. FIG. 18 shows that the slave node unit 404 communicates directly with the DASD 32 of the central site 16. Thus, the slave site has ready access to the configuration files, service history files, and other data described above in connection with FIGS. 2–17 as residing at the central site. This direct access permits a seamless interconnection between the central site and the slave site in which service processing as between the central site 16 and a slave site 402 is transparent to the customer. That is, a customer at a remote location 12, 14 is completely unaware as to whether a service request sent by the customer to the central site is being handled by the central site service facility or is actually being handled by a slave site service facility.

More particularly, if a service request is sent from the central node 28 to a slave node 404, then the tasks of service research, service application, and product rebuilding and related tasks of service processing can be performed by the slave site service facility processors in accordance with the customer request. Any central data files needed by the slave site processors 36, 38, 40 can be directly accessed from the central site DASD 32 and temporarily copied into the slave site storage 30 for processing. In this way, the central site DASD remains the solitary repository of archival data needed for processing service requests. Alternatively, copies of some of the central site files, such as the unchanging VM base files, might be kept at the slave sites because such data will not be changed at the slave site.

As described above, the distributed network architecture implementation provides a system in which the processing of remote location service requests is moved out from a single central site and is distributed across multiple service facilities under the control of a central node. In either implementation, the single central site processing of FIG. 1 or the distributed processing of FIG. 18, the software maintenance task can be performed through a common interactive customer interface through which service request are received, formatted, performed, and returned to the requesting customer in executable form.

Thus, the computer network systems described above include a central service facility that operates with a front end that permits a remote location customer to request service and receive updated executable code back from the service facility. The front end provides a consistent interface across the different software platforms of the network. The customer can easily initiate servicing of a program by composing a service request through the front end. The customer can specify a range of optional operations to be performed at the central site, including service research, requesting service, applying service, and installing fixes from the central service facility to the remote location. The requested service can be performed at the central site and the results provided back to the remote location customer, or the service and base product can be returned for application at the remote location. The source code for the program product being updated advantageously resides only at the central service facility. All code is returned to the remote location over the network in an executable form.

The present invention has been described above in terms of a presently preferred embodiment so that an understanding of the present invention can be conveyed. There are, however, many configurations for network software maintenance systems not specifically described herein but with which the present invention is applicable. The present invention should therefore not be seen as limited to the particular embodiment described herein, but rather, it should be understood that the present invention has wide applicability with respect to network maintenance systems generally. All modifications, variations, or equivalent arrangements that are within the scope of the attached claims should therefore be considered to be within the scope of the invention.

We claim:

1. A method of applying service to a computer program that is to be executed at a remote location connected to a central computer site of a computer network, the method comprising the steps of:

interactively receiving a request for a computer program service from a customer at a remote location interface with optional service incorporation instructions of the remote location customer;

providing the received request for service over the computer network to a service facility at the central computer site;

determining the components of the requested service at the central computer site; and providing the results of the requested service over the computer network back to the customer at the remote location interface.

2. A method as defined in claim 1, wherein the step of determining comprises the steps of:

researching the service history of the computer program as installed at the remote location customer to determine what level of service already exists at the remote location customer;

determining a highest current level of service that can be applied to the computer program; and evaluating the service not yet applied to the computer program.

3. A method as defined in claim 2, wherein the step of providing results comprises providing a report of the researched service history, the highest current level of service for the computer program, and the evaluated service not yet applied to the computer program.

4. A method as defined in claim 3, wherein:

the step of providing results further includes the step of applying the evaluated service not yet applied to the computer program at the central computer site, in accordance with the identified optional service incorporation instructions.

5. A method as defined in claim 4, wherein the step of providing results further includes providing the computer program with the applied evaluated service in executable code back to the remote location customer over the computer network.

6. A method as defined in claim 1, wherein the step of interactively receiving a request includes the steps of:

displaying an enter screen that provides a menu of customer-selectable options for functioning of the computer network;

receiving a customer menu selection at the remote location; and operating on the customer menu selection to provide the request for service in a predetermined format.

7. A method as defined in claim 6, wherein the step of receiving a customer menu selection includes interactively receiving screen input data from the customer that identifies the request for service and the computer program on which the requested service is to be performed.

8. A method as defined in claim 7, further including the step of supplying information, not included in the received screen input data, that identifies the request for service and the computer program by referring to a previously received service request identifiable from the received screen input data.

9. A method as defined in claim 6, wherein the step of displaying an enter screen includes presenting customer-selectable options comprising a Configure Customer Product Image Profile function, a Configure Software Product function, a Research and Apply Software Product Service function, and an Install Serviced Software Product Files function.

10. A method as defined in claim 6, wherein the step of determining the components of the requested service includes the step of performing the requested service at the central site.

11. A method as defined in claim 6, wherein the step of determining the components of the requested service includes the step of performing the requested service at a slave site connected to the central computer site of the computer network.

12. A method as defined in claim 6, wherein the step of performing the requested service includes changing a set of node configuration files relating to the remote location in accordance with the performed service.

13. A method as defined in claim 6, wherein the step of performing the requested service includes changing a set of node service history files relating to the remote location in accordance with the performed service.

14. A method as defined in claim 6, wherein the step of determining further includes the steps of:

researching the service history of the computer program as installed at the remote location customer to determine what level of service already exists at the remote location customer;

determining a highest current level of service that can be applied to the computer program; and identifying a program fix comprising a service not yet applied to the computer program responsive to the requested service.

15. A method as defined in claim 14, wherein the step of performing the requested service includes retrieving the identified program fix from a storage device at the central computer site.

16. A method as defined in claim 15, wherein the identified program fix is retrieved from the storage device as executable code.

17. A method as defined in claim 14, wherein the step of performing the requested service includes retrieving the identified program fix from a storage device at a slave site connected to the central computer site of the computer network.

18. A computer network system having a central computer processor node at a central computer site connected by a network to one or more computer processors at remote locations, each computer processor at a remote location supporting the execution of at least one computer program that is maintained by periodic application of service, the system further comprising:

a front end interface that permits interactively receiving a request for a service relating to the computer program from a customer of a computer processor input screen at a remote location with optional service incorporation instructions of the customer;

a network interface connection that permits providing the received request for service over the network to the central computer site;

a service facility at the central computer site that receives the request for service, determines the components of the requested service, and provides the results of the requested service over the network back to the customer at the front end interface.

19. A system as defined in claim 18, wherein the service facility researches a service history data file of the central computer site relating to the computer program as installed at the customer remote location to determine what level of service already exists at the remote location, determines a highest current level of service that can be applied to the computer program, and evaluates the service not yet applied to the computer program.

20. A system as defined in claim 19, wherein the results provided by the service facility comprise a report of the researched service history, the highest current level of service for the computer program, and the evaluated service not yet applied to the computer program.

21. A system as defined in claim 20, wherein the service facility applies the evaluated service not yet applied to the computer program at the central site, in accordance with the optional service incorporation instructions.

22. A system as defined in claim 21, wherein the service facility provides the computer program with the applied evaluated service in executable code back to the remote location customer over the network, without source code.

23. A system as defined in claim 20, wherein the request for service received by the front end interface includes optional service incorporation instructions of the customer; and the system further includes at least one slave node at a slave computer site connected to the central node by the network, the slave computer site including a slave service facility that receives the request for service from the central node, determines the components of the requested service, and provides the results of the requested service over the network back to the customer at the front end interface, wherein the slave service facility further applies the evaluated service, not yet applied to the computer program, in accordance with the optional service incorporation instructions.

24. A system as defined in claim 23, wherein the slave service facility provides the computer program with the applied evaluated service in executable code back to the remote location customer over the network, without source code.

25. A system as defined in claim 18, wherein the front end interface displays an enter screen on the remote location computer processor input screen that provides a menu of customer-selectable options for functioning of the computer network, receives a customer menu selection, and operates on the customer menu selection to provide the request for service in a predetermined format.

26. A system as defined in claim 18, wherein the front end interface interactively receives screen input data from the customer that identifies the request for service and the computer program on which the requested service is to be performed.

27. A system as defined in claim 26, wherein the front end interface supplies information, not included in the received screen input data, that identifies the request for service and the computer program by referring to a previously received service request identifiable from the received screen input data.

28. A system as defined in claim 18, wherein the enter screen displayed by the front end interface includes a menu of customer-selectable function options comprising a Configure Customer Product Image Profile function, a Configure Software Product function, a Research and Apply Software Product Service function, and an Install Serviced Software Product Files function.

29. A system as defined in claim 18, wherein the service facility performs the determined components of the requested service at the central computer site.

30. A system as defined in claim 29, wherein the service facility changes a set of node configuration files relating to the remote location in accordance with the performed service.

31. A system as defined in claim 29, wherein the service facility changes a set of node service history files relating to the remote location in accordance with the performed service.

32. A system as defined in claim 29, wherein the service facility researches the service history of the computer program as installed at the remote location customer to determine what level of service already exists at the remote location customer, determines a highest current level of service that can be applied to the computer program, and identifies a program fix comprising a service not yet applied to the computer program responsive to the requested service.

33. A system as defined in claim 32, wherein the service facility retrieves the identified program fix from a storage device at the central computer site.

34. A system as defined in claim 33, wherein the identified program fix is retrieved from the storage device as executable code.

35. A system as defined in claim 29, wherein the service facility includes a rebuild processor that rebuilds the computer program after the service has been applied such that the serviced computer program can be executed by the remote location computer processor.

36. A system as defined in claim 29, wherein the service facility includes a service apply processor that applies the requested service to the computer program so that the serviced computer program includes the identified components of the service.

37. A system as defined in claim 29, wherein the service facility includes a service research processor that examines a set of data repository files in data storage of the central computer facility to determine what level of service has already been applied to the computer program at the remote location, determine a highest current level of service that can be applied to the computer program, and identify the service not yet applied to the computer program.

38. A system as defined in claim 18, wherein the system further includes at least one slave node at a slave computer site connected to the central node by the network, the slave computer site including a slave service facility that receives the request for service from the central node, determines the components of the requested service, and provides the results of the requested service over the network back to the customer at the front end interface, and wherein the slave service facility performs the determined components of the requested service at the slave computer site.

39. A system as defined in claim 38, wherein the slave service facility changes a set of node configuration files at the service facility of the central computer site relating to the remote location in accordance with the performed service.

40. A system as defined in claim 38, wherein the slave service facility changes a set of node service history files at the service facility of the central computer site relating to the remote location in accordance with the performed service.

41. A system as defined in claim 38, wherein the slave service facility researches the service history of the computer program as installed at the remote location customer to determine what level of service already exists at the remote location customer, determines a highest current level of service that can be applied to the computer program, and identifies a program fix comprising a service not yet applied to the computer program responsive to the requested service.

42. A system as defined in claim 41, wherein the slave service facility retrieves the identified program fix from a storage device at the central computer site.

43. A system as defined in claim 42, wherein the identified program fix is retrieved from the storage device as executable code.

44. A system as defined in claim 38, wherein the slave service facility includes a rebuild processor that rebuilds the computer program after the service has been applied such that the serviced computer program can be executed by the remote location computer processor.

45. A system as defined in claim 38, wherein the slave service facility includes a service apply processor that applies the requested service to the computer program so that the serviced computer program includes the identified components of the service.

46. A system as defined in claim 38, wherein the slave service facility includes a service research processor that examines a set of data repository files in data storage of the central computer facility to determine what level of service has already been applied to the computer program at the remote location, determine a highest current level of service that can be applied to the computer program, and identify the service not yet applied to the computer program.

47. A program storage device readable by a machine at a central computer site, tangibly embodying a program of instructions executable by the machine to perform method steps for applying service to a computer program executed on a computer processor at a remote location connected to the central computer site by a network, the method steps performed by the machine comprising:

receiving a request for service over the network that was interactively produced by a customer at a remote location interface of the computer processor with optional service incorporation instructions of the customer;

determining the components of the requested service using a service facility at the central computer site; and providing the results of the requested service over the network back to the customer at the remote location interface.

48. A program storage device as defined in claim 47, wherein the step of determining performed by the machine comprises the steps of:

researching a central computer site service history of the computer program as installed at the remote location to determine what level of service already exists at the remote location;

determining a highest current level of service that can be applied to the computer program; and evaluating the service not yet applied to the computer program.

49. A program storage device as defined in claim 48, wherein the step of providing results performed by the machine comprises providing a report of the researched service history, the highest current level of service for the computer program, and the evaluated service not yet applied to the computer program.

50. A program storage device as defined in claim 49, wherein the step of providing results performed by the machine further includes providing the computer program having the applied evaluated service in executable code back to the remote location over the network.

51. A program storage device as defined in claim 47, wherein the step of determining the components of the requested service performed by the machine includes the step of performing the requested service at the central site.

52. A program storage device as defined in claim 51, wherein the step of performing the requested service performed by the machine includes changing a set of central computer site node configuration files relating to the remote location in accordance with the performed service.

53. A program storage device as defined in claim 51, wherein the step of performing the requested service performed by the machine includes changing a set of central computer site node service history files relating to the remote location in accordance with the performed service.

54. A program storage device as defined in claim 51, wherein the step of determining performed by the machine further includes the steps of:

researching a central computer site service history of the computer program as installed at the remote location customer to determine what level of service already exists at the remote location customer;

determining a highest current level of service that can be applied to the computer program; and identifying a program fix comprising a service not yet applied to the computer program responsive to the requested service.

55. A program storage device as defined in claim 54, wherein the step of performing the requested service performed by the machine includes retrieving the identified program fix from a storage device at the central computer site.

56. A program storage device as defined in claim 55, wherein the identified program fix is retrieved from the storage device as executable code.

57. A program storage device as defined in claim 47, wherein the program storage device is readable by a slave machine at a slave computer site connected to the central computer site by the network, the program storage device tangibly embodying a program of instructions executable by the slave machine to perform method steps for applying service to a computer program executed on a computer processor at a remote location connected to the central computer site and the slave computer site by a computer network, the method steps performed by the slave machine comprising:

receiving a request for service over the network that was interactively produced by a customer at a remote location interface of the computer processor;

determining the components of the requested service to be performed by the slave machine using a service facility at the slave computer site; and providing the results of the requested service over the network back to the customer at the remote location interface.

58. A program storage device as defined in claim 57, wherein the step of determining performed by the slave machine comprises the steps of:

researching a central computer site service history of the computer program as installed at the remote location to determine what level of service already exists at the remote location;

determining a highest current level of service that can be applied to the computer program; and evaluating the service not yet applied to the computer program.

59. A program storage device as defined in claim 57, wherein the step of providing results performed by the slave machine comprises providing a report of the researched service history, the highest current level of service for the computer program, and the evaluated service not yet applied to the computer program.

60. A program storage device as defined in claim 59, wherein the step of providing results performed by the slave machine further includes providing the computer program having the applied evaluated service in executable code back to the remote location over the network.

61. A program storage device as defined in claim 57, wherein the step of determining the components of the requested service performed by the slave machine includes the step of performing the requested service at the slave computer site.

62. A program storage device as defined in claim 61, wherein the step of performing the requested service performed by the slave machine includes changing a set of central computer site node configuration files relating to the remote location in accordance with the performed service.

63. A program storage device as defined in claim 61, wherein the step of performing the requested service performed by the slave machine includes changing a set of central computer site node service history files relating to the remote location in accordance with the performed service.

64. A program storage device as defined in claim 61, wherein the step of determining performed by the slave machine further includes the steps of:

researching a central computer site service history of the computer program as installed at the remote location customer to determine what level of service already exists at the remote location customer;

determining a highest current level of service that can be applied to the computer program; and identifying a program fix comprising a service not yet applied to the computer program responsive to the requested service.

65. A program storage device as defined in claim 64, wherein the step of performing the requested service performed by the slave machine includes retrieving the identified program fix from a storage device at the central computer site.

66. A program storage device as defined in claim 64, wherein the identified program fix is retrieved from the storage device as executable code.

67. A program storage device readable by a machine at a remote location connected to a central computer site of a network, the program storage device tangibly embodying a program of instructions executable by the remote location machine to perform method steps for applying service to a computer program at the central computer site to be executed at the remote location, the method steps performed by the remote location machine comprising:

interactively receiving a request for a computer program service from a customer at a remote location interface with optional service incorporation instructions of the remote location customer and providing the optional service incorporation instructions;

providing the received request for service over the computer network to a service facility at the central computer site that determines the components of the requested service at the central computer site; and receiving the results of the requested service over the network from the central computer site at the remote location interface.

68. A program storage device as defined in claim 67, wherein the step of interactively receiving a request performed by the machine includes the steps of:

displaying an enter screen that provides a menu of customer-selectable options for functioning of the network;

receiving a customer menu selection at the remote location; and operating on the customer menu selection to provide the request for service in a predetermined format.

69. A program storage device as defined in claim 68, wherein:

the step of interactively receiving a request performed by the remote location machine includes providing the optional service incorporation instructions to the service facility such that the evaluated service not yet applied to the computer program is applied at the central site in accordance with the identified optional service incorporation instructions.

70. A program storage device as defined in claim 67, wherein the step of interactively receiving a request performed by the remote location machine includes the steps of:

displaying an enter screen that provides a menu of customer-selectable options for functioning of the network;

receiving a customer menu selection at the remote location; and operating on the customer menu selection to provide the request for service in a predetermined format.

71. A program storage device as defined in claim 70, wherein the step of receiving a customer menu selection performed by the remote location machine includes interactively receiving screen input data from the customer that identifies the request for service and the computer program on which the requested service is to be performed.

72. A program storage device as defined in claim 71, further including the step performed by the remote location machine of supplying information, not included in the received screen input data, that identifies the request for service and the computer program by referring to a previously received service request identifiable from the received screen input data.

73. A program storage device as defined in claim 67, wherein the step of displaying an enter screen performed by the remote location machine includes presenting customer-selectable options comprising a Configure Customer Product Image Profile function, a Configure Software Product function, a Research and Apply Software Product Service function, and an Install Serviced Software Product Files function.

\* \* \* \* \*